US00RE38772E

(19) United States
(12) Reissued Patent
Elsässer et al.

(10) Patent Number: US RE38,772 E
(45) Date of Reissued Patent: *Aug. 9, 2005

(54) DISK STORAGE DEVICE HAVING AN UNDERCUT HUB MEMBER

(75) Inventors: Dieter Elsässer, St. Georgen (DE); Johann von der Heide, Schramberg (DE); Rolf Müller, München (DE)

(73) Assignee: Papst Licensing GmbH & Co. KG, St. Georgen (DE)

( * ) Notice: This patent is subject to a terminal disclaimer.

(21) Appl. No.: 09/441,504

(22) Filed: Nov. 17, 1999

(Under 37 CFR 1.47)

Related U.S. Patent Documents

Reissue of:
(64) Patent No.: 5,173,814
Issued: Dec. 22, 1992
Appl. No.: 07/653,100
Filed: Feb. 8, 1991

U.S. Applications:
(63) Continuation of application No. 08/819,099, filed on Mar. 4, 1997, now Pat. No. Re. 37,058, which is a continuation of application No. 08/360,226, filed on Dec. 20, 1994, now abandoned, which is a continuation of application No. 07/402,917, filed on Sep. 5, 1989, now Pat. No. 5,001,581, which is a continuation of application No. 07/201,736, filed on Jun. 2, 1988, now Pat. No. 4,894,738, which is a continuation-in-part of application No. 07/038,049, filed on Apr. 14, 1987, now Pat. No. 4,843,500, which is a continuation-in-part of application No. 06/767,671, filed on Aug. 21, 1985, now Pat. No. 4,658,312, which is a continuation of application No. 06/412,093, filed on Aug. 27, 1982, now abandoned, which is a continuation-in-part of application No. 06/326,559, filed on Dec. 2, 1981, now Pat. No. 4,519,010, and a continuation-in-part of application No. 06/244,971, filed on Mar. 18, 1981, now abandoned, said application No. 07/201,736, is a continuation-in-part of application No. 07/032,954, filed on Mar. 31, 1987, now Pat. No. 4,779,165, which is a continuation of application No. 06/733,231, filed on May 10, 1985, now abandoned, which is a continuation-in-part of application No. 06/412,093.

(30) Foreign Application Priority Data

Sep. 7, 1981 (DE) ..... 3135385

(51) Int. Cl.[7] ..... G11B 17/08
(52) U.S. Cl. ..... 360/98.07; 360/97.02; 360/99.08
(58) Field of Search ..... 360/98.07, 98.08, 360/99.08, 99.12

(56) References Cited

U.S. PATENT DOCUMENTS 3,250,929 A 5/1966 Maier
3,290,525 A 12/1966 Sudmeier (Continued)

FOREIGN PATENT DOCUMENTS

CH 654 455 A5 2/1986
DE 1244283 7/1967

(Continued)

OTHER PUBLICATIONS

Drawing "GAE Motor" (1 sheet) Papst Motoren GmbH & Co. KG.

(Continued)

*Primary Examiner*—A. J. Heinz
(74) *Attorney, Agent, or Firm*—Welsh & Katz, Ltd.

(57) ABSTRACT

A disk memory drive includes a brushless drive outer rotor motor having an internal space and a stator with windings. The outer rotor coaxially encircles the stator and a substantially cylindrical air gap is defined between the stator and the rotor. The rotor includes permanent magnets and a hub fixedly connected with the magnet. A disk mounting section is provided on the hub for accommodating at least one storage disk positioned in a clear space, the mounting section being adapted to extend through a central aperture of the storage disk. The windings and the magnets interacting with the windings are disposed for at least half of the axial longitudinal dimension thereof within a space surrounded by the disk mounting section of the hub. Bearings rotatably mount the rotor and the hub.

23 Claims, 10 Drawing Sheets

U.S. PATENT DOCUMENTS

| | | | | | |
|---|---|---|---|---|---|
| 3,329,845 | A | | 7/1967 | Lear | |
| 3,527,969 | A | | 9/1970 | Papst | |
| 3,596,121 | A | | 7/1971 | Chang | |
| 3,634,873 | A | | 1/1972 | Nishimura | |
| 3,691,542 | A | | 9/1972 | Gabor | |
| 3,706,085 | A | | 12/1972 | Mowrey | |
| 3,732,025 | A | | 5/1973 | Miles, Jr. | |
| 3,805,134 | A | | 4/1974 | Osamu | |
| 3,840,761 | A | | 10/1974 | Müller | |
| 3,845,339 | A | | 10/1974 | Merkle | |
| 3,849,800 | A | | 11/1974 | Cuzner | |
| 3,860,843 | A | | 1/1975 | Kawasaki | |
| 3,864,610 | A | | 2/1975 | Kawamoto | |
| 3,864,748 | A | | 2/1975 | Herdman | |
| 3,873,897 | A | | 3/1975 | Müller | |
| 3,888,403 | A | | 6/1975 | Yoshida | |
| 3,891,905 | A | | 6/1975 | Müller | |
| 3,922,590 | A | | 11/1975 | Warren | |
| 3,940,670 | A | | 2/1976 | Tanikoshi | |
| 3,967,200 | A | | 6/1976 | Tetsugu | |
| 3,977,804 | A | | 8/1976 | Kitagawa | |
| 3,988,024 | A | | 10/1976 | Watanabe | |
| 4,005,490 | A | | 1/1977 | Duncan | |
| 4,008,422 | A | | 2/1977 | Sodekoda | |
| 4,031,558 | A | | 6/1977 | Kusaka | |
| 4,034,411 | A | | 7/1977 | Kraemer | |
| 4,054,931 | A | | 10/1977 | Bolton | |
| 4,062,049 | A | | 12/1977 | Dirks | |
| 4,092,572 | A | | 5/1978 | Murata | |
| 4,099,104 | A | | 7/1978 | Müller | |
| 4,101,945 | A | | 7/1978 | Butsch | |
| 4,115,715 | A | | 9/1978 | Müller | |
| 4,130,845 | A | | 12/1978 | Kulma | |
| 4,136,366 | A | | 1/1979 | Ogiro | |
| 4,150,406 | A | | 4/1979 | Stollorz | |
| 4,167,692 | A | | 9/1979 | Sekiya | |
| 4,174,484 | A | | 11/1979 | Schmider | |
| 4,181,867 | A | | 1/1980 | Müller | |
| 4,185,308 | A | | 1/1980 | Fujioka | |
| 4,190,870 | A | | 2/1980 | Avina | |
| 4,193,646 | A | | 3/1980 | Rocki | |
| 4,194,225 | A | | 3/1980 | Hasler | |
| 4,194,743 | A | | 3/1980 | Ohsawa | |
| 4,197,489 | A | | 4/1980 | Dunn | |
| 4,205,357 | A | * | 5/1980 | Barton | 360/98.08 |
| 4,216,512 | A | | 8/1980 | Vidwans | |
| 4,228,387 | A | | 10/1980 | Brown | |
| 4,249,221 | A | | 2/1981 | Cox | |
| 4,252,353 | A | | 2/1981 | Raj | |
| 4,268,878 | A | | 5/1981 | Kearns | |
| 4,275,339 | A | | 6/1981 | Burke | |
| 4,280,072 | A | | 7/1981 | Gotou | |
| 4,280,155 | A | | 7/1981 | Scott | |
| 4,282,554 | A | | 8/1981 | Ho | |
| 4,283,644 | A | | 8/1981 | Kondo | |
| 4,285,016 | A | | 8/1981 | Gilovich | |
| 4,286,184 | A | | 8/1981 | Kogler | |
| 4,307,425 | A | | 12/1981 | Kaneko | |
| 4,317,146 | A | | 2/1982 | Gervais | |
| 4,329,604 | A | | 5/1982 | Dunstan | |
| 4,329,722 | A | | 5/1982 | West | |
| 4,336,470 | A | | 6/1982 | Gutris | |
| 4,337,491 | A | | 6/1982 | Hasler | |
| 4,352,133 | A | | 9/1982 | Hager | |
| 4,356,437 | A | | 10/1982 | Saito | |
| 4,359,761 | A | | 11/1982 | Papst | |
| 4,363,046 | A | | 12/1982 | Saito | |
| 4,363,057 | A | | 12/1982 | Silverling | |
| 4,365,187 | A | | 12/1982 | McDaniel | |
| 4,365,916 | A | | 12/1982 | Miyakawa | |
| 4,366,516 | A | | 12/1982 | Ogata | |
| 4,394,594 | A | | 7/1983 | Schmider | |
| 4,396,959 | A | | 8/1983 | Harrison | |
| 4,396,964 | A | | 8/1983 | Morehouse | |
| 4,398,134 | A | | 8/1983 | Müller | |
| 4,417,167 | A | | 11/1983 | Ishii | |
| 4,430,603 | A | | 2/1984 | Müller | |
| 4,438,542 | A | | 3/1984 | Schuh | |
| 4,445,159 | A | | 4/1984 | Nemoto | |
| 4,471,395 | A | | 9/1984 | Beck | |
| 4,497,138 | A | | 2/1985 | Schriber | |
| 4,516,177 | A | | 5/1985 | Moon | |
| 4,519,010 | A | | 5/1985 | Elsässer | |
| 4,529,900 | A | | 7/1985 | Uzuka | |
| 4,535,373 | A | | 8/1985 | Schuh | |
| 4,553,183 | A | | 11/1985 | Brown | |
| 4,554,473 | A | | 11/1985 | Müller | |
| 4,562,496 | A | | 12/1985 | Saito | |
| RE32,075 | E | | 1/1986 | Harrison et al. | |
| 4,599,664 | A | * | 7/1986 | Schuh | 360/99.08 |
| 4,607,182 | A | | 8/1986 | Ballhaus | |
| 4,616,538 | A | | 10/1986 | Hessbiiggen | |
| 4,656,545 | A | | 4/1987 | Kakuta | |
| 4,658,312 | A | | 4/1987 | Elsasser | |
| 4,672,250 | A | | 6/1987 | Seitz | |
| 4,672,487 | A | | 6/1987 | Brand | |
| 4,692,827 | A | | 9/1987 | Biermeier | |
| 4,701,653 | A | | 10/1987 | Merkle | |
| 4,717,977 | A | | 1/1988 | Brown | |
| 4,725,904 | A | | 2/1988 | Dalziel | |
| 4,739,203 | A | | 4/1988 | Miyao | |
| 4,739,425 | A | | 4/1988 | Dierkes | |
| 4,739,427 | A | | 4/1988 | Kilmer | |
| 4,743,995 | A | | 5/1988 | Castle | |
| RE32,702 | E | | 6/1988 | Hasler | |
| 4,754,351 | A | | 6/1988 | Wright | |
| 4,779,165 | A | | 10/1988 | Elsässer | |
| 4,780,777 | A | | 10/1988 | Biermeier | |
| 4,797,762 | A | | 1/1989 | Levy | |
| 4,805,055 | A | | 2/1989 | Wright | |
| 4,814,652 | A | | 3/1989 | Wright | |
| 4,829,657 | A | | 5/1989 | Wright | |
| 4,843,500 | A | | 6/1989 | Elsässer | |
| 4,905,110 | A | * | 2/1990 | Krum | 360/99.08 |
| 4,922,406 | A | | 5/1990 | Schuh | |
| 4,928,029 | A | | 5/1990 | Wright | |
| 4,949,000 | A | | 8/1990 | Petersen | |
| 4,991,211 | A | | 2/1991 | Cap | |
| 5,001,581 | A | | 3/1991 | Elsässer | |
| 5,006,943 | A | | 4/1991 | Elsässer | |
| 5,040,085 | A | | 8/1991 | Elsässer | |
| 5,128,819 | A | | 7/1992 | Elsässer | |
| 5,173,814 | A | | 12/1992 | Elsässer | |
| 5,216,557 | A | | 6/1993 | Elsässer | |
| RE34,412 | E | | 10/1993 | Elsässer | |
| 5,251,081 | A | | 10/1993 | Cossette | |
| 5,382,853 | A | | 1/1995 | von der Heide | |
| 5,422,769 | A | | 6/1995 | Elsässer | |
| 5,424,887 | A | | 6/1995 | Schuh | |
| 5,446,610 | A | | 8/1995 | Elsässer | |
| 5,557,487 | A | | 9/1996 | Elsässer | |
| 5,661,351 | A | | 8/1997 | von der Heide | |
| 5,708,539 | A | | 1/1998 | Schuh | |
| 5,729,403 | A | | 3/1998 | Schuh | |
| RE35,792 | E | | 5/1998 | Elsässer | |
| 5,774,302 | A | | 6/1998 | Elsässer | |
| 5,777,822 | A | | 7/1998 | Schuh | |
| 5,801,900 | A | | 9/1998 | Elsässer | |
| RE36,016 | E | | 12/1998 | Cap | |
| 5,946,161 | A | | 8/1999 | Schuh | |

FOREIGN PATENT DOCUMENTS

| | | | |
|---|---|---|---|
| DE | 1954409 | | 6/1970 |
| DE | 2028228 | | 12/1970 |
| DE | 2319579 | | 4/1973 |
| DE | 2225442 | | 12/1973 |
| DE | 2346380 | | 11/1974 |
| DE | 2639055 | | 3/1977 |
| DE | 2612464 | | 8/1977 |
| DE | 26 17 860 | | 11/1977 |
| DE | 2804787 | | 9/1978 |
| DE | 2840057 | | 3/1979 |
| DE | 2647675 | | 4/1979 |
| DE | 2749729 | | 5/1979 |
| DE | 2841137 | | 5/1979 |
| DE | 3049334 | | 10/1981 |
| DE | 3122049 | | 7/1982 |
| DE | 3144629 | A1 | 7/1982 |
| DE | 3135385 | A1 | 3/1983 |
| DE | 3314079 | | 12/1983 |
| DE | 3538480 | | 4/1986 |
| EP | 0 069 545 | | 1/1983 |
| EP | 0 015 739 | | 4/1983 |
| EP | 0094484 | A1 | 11/1983 |
| EP | 0 107 380 | | 2/1984 |
| EP | 0 151 259 | | 4/1985 |
| EP | 0151258 | A1 | 8/1985 |
| EP | 0151260 | A1 | 8/1985 |
| EP | 0 172 459 | | 2/1986 |
| EP | 0 263 932 | | 4/1988 |
| FR | 2415859 | | 8/1979 |
| FR | 2453527 | | 10/1980 |
| GB | 393617 | | 6/1933 |
| GB | 1407431 | | 8/1972 |
| GB | 1328717 | | 8/1973 |
| GB | 1434192 | | 5/1976 |
| GB | 1486070 | | 9/1977 |
| GB | 2005482 | | 4/1979 |
| GB | 2013388 | | 8/1979 |
| GB | 2032197 | | 4/1980 |
| GB | 1572586 | | 7/1980 |
| GB | 2072924 | | 10/1981 |
| GB | 2075240 | | 11/1981 |
| GB | 1604121 | | 12/1981 |
| GB | 2092834 | A | 8/1982 |
| GB | 2166586 | | 5/1986 |
| GB | 2195812 | | 4/1988 |
| JP | 53-55509 | | 10/1951 |
| JP | 41-015606 | | 9/1966 |
| JP | 41-021084 | | 9/1966 |
| JP | 49-34714 | | 6/1972 |
| JP | 48-86510 | | 11/1973 |
| JP | 48-87809 | | 11/1973 |
| JP | 49-46716 | | 5/1974 |
| JP | 49-71909 | | 7/1974 |
| JP | 49-85110 | | 7/1974 |
| JP | 50-90905 | | 7/1975 |
| JP | 50-128510 | | 10/1975 |
| JP | 50-146309 | | 11/1975 |
| JP | 50-152708 | | 12/1975 |
| JP | 50-159704 | | 12/1975 |
| JP | 51-33410 | | 3/1976 |
| JP | 50-128506 | | 3/1976 |
| JP | 51-57011 | | 5/1976 |
| JP | 51-62002 | | 5/1976 |
| JP | 51-26669 | | 7/1976 |
| JP | 51-84516 | | 7/1976 |
| JP | 51-121306 | | 10/1976 |
| JP | 51-151513 | | 12/1976 |
| JP | 52-6914 | | 1/1977 |
| JP | 52-004002 | | 1/1977 |
| JP | 52-42209 | | 3/1977 |
| JP | 52-50704 | | 4/1977 |
| JP | 52-048009 | | 4/1977 |
| JP | 52-145312 | | 11/1977 |
| JP | 52-170004 | | 12/1977 |
| JP | 53-23010 | | 3/1978 |
| JP | 53-39727 | | 4/1978 |
| JP | 53-51719 | | 5/1978 |
| JP | 53-55106 | | 5/1978 |
| JP | 53-57010 | | 5/1978 |
| JP | 53-055724 | | 5/1978 |
| JP | 53-70309 | | 6/1978 |
| JP | 53-76809 | | 7/1978 |
| JP | 54-41619 | | 3/1979 |
| JP | 54-9921 | | 5/1979 |
| JP | 54-58011 | | 5/1979 |
| JP | 55-170495 | | 5/1979 |
| JP | 52-099908 | | 8/1979 |
| JP | 54-111317 | | 8/1979 |
| JP | 54-121914 | | 9/1979 |
| JP | 54-139819 | | 9/1979 |
| JP | 54-136309 | | 10/1979 |
| JP | 54-156106 | | 12/1979 |
| JP | 55-43360 | | 3/1980 |
| JP | 55-141258 | | 4/1980 |
| JP | 55-139674 | | 10/1980 |
| JP | 55-25725 | | 12/1980 |
| JP | 56-9594 | | 1/1981 |
| JP | 56-107364 | | 8/1981 |
| JP | 56-166760 | | 12/1981 |
| JP | 57-53876 | | 3/1982 |
| JP | 57-171532 | | 10/1982 |
| JP | 58-22571 | | 2/1983 |
| JP | 58-30965 | | 2/1983 |
| JP | 58-30312 | | 4/1983 |
| JP | 58-159201 | | 9/1983 |
| JP | 58-200480 | | 11/1983 |
| JP | 59-22273 | | 2/1984 |
| JP | 59-207069 | | 11/1984 |
| JP | 61-34771 | | 2/1986 |
| JP | 61-20871 | | 6/1986 |
| WO | WO 80/01525 | | 7/1980 |
| WO | 8401863 | | 5/1984 |

OTHER PUBLICATIONS

Drawing "Motor 9333 5310 001" (2 sheets) Papst Motoren GmbH & Co. KG.

Zweipulsige Kollectoriose Gleichstrom Motoren (No Month) 1977; Papst Motoren KG., Germany.

Brushless DC Drive Spindle "Sextant", Rotron, Inc., Woodstock, N.Y., Nov. 17, 1980.

Kobayashi et al., "Direct Drive System For Isolated Loop Drive." National Technical Report, vol. 22, No. 4, Aug. 1976.

"Who Need High Capacities?", M. Pearce, *Computer Systems*, Nov. 1983, pp. 81–84.

"Motor in spindle gives micro–Winchester room for 140M bytes", J. Swartz, *Mini–Micro Systems*, Feb. 1983. pp. 143–144, 147–148.

An Overview of the Sperry Flight Management Computer system for the Boeing 757/767 Airplanes (1979).

Plastic Ridge Seal to Trap Airborne Submicron Particles, V.J. Trotter, Jr. *IBM Technical Disclosure Bulletin*, vol. 19, No. 4 Sep. 1976.

Fixed–Head Disk Memory Unit for High Reliability Applications, Isozaki et al. *NEC Research & Development*, No. 44 Jan. 1977 at pp. 57–67.

Hardware Maintenance Manual for Control Data Fixed Disk Drive Model 9414.

German article entitled: "Diskettenanantrieb im Mini–Floppy–Laufwerk," taken from *VDI—Berichte Nr. 482* Von Ing. (Grad.) K. Schramm, Nurnberg., pp. 56–59 (1983).
German brochure entitled: "P.M. Computerheft—*Computer Entdecken Und Vertehen*", pp. 49–51 (Feb. 1984).
"Machine Tools, New Edition", Ito et al., Published 1970.
"*American Metal Market*, V. 92 (p. 10), Jan. 30, 1984:Composites Used Extensively In Buick Tin–Plating Systems".
*Machinery and Production Engineering*, V. 116, N. 3003 (pp. 861–862), 1970 "Universal Power Chucks Facilitate Small Batch Production".
*Production*, V. 93, No. 5, May 1984 "Spotlight On Machining Centers".

* cited by examiner

FIG. 1
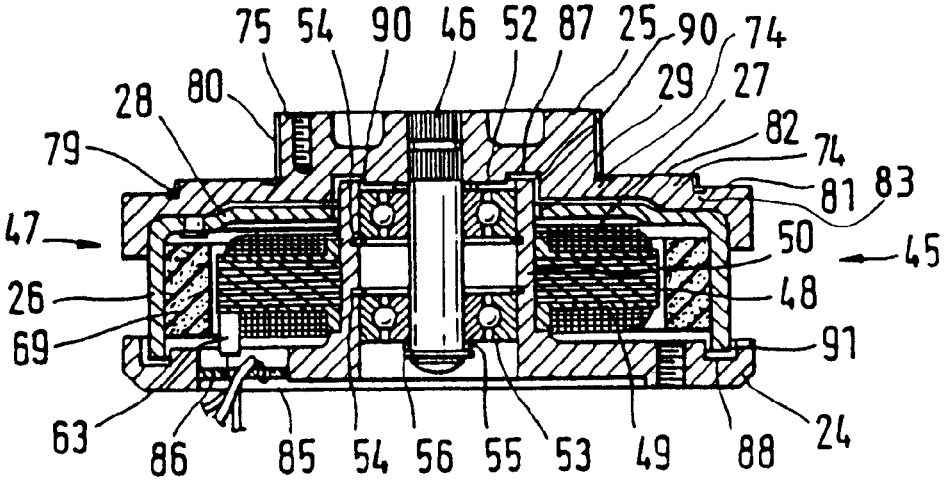
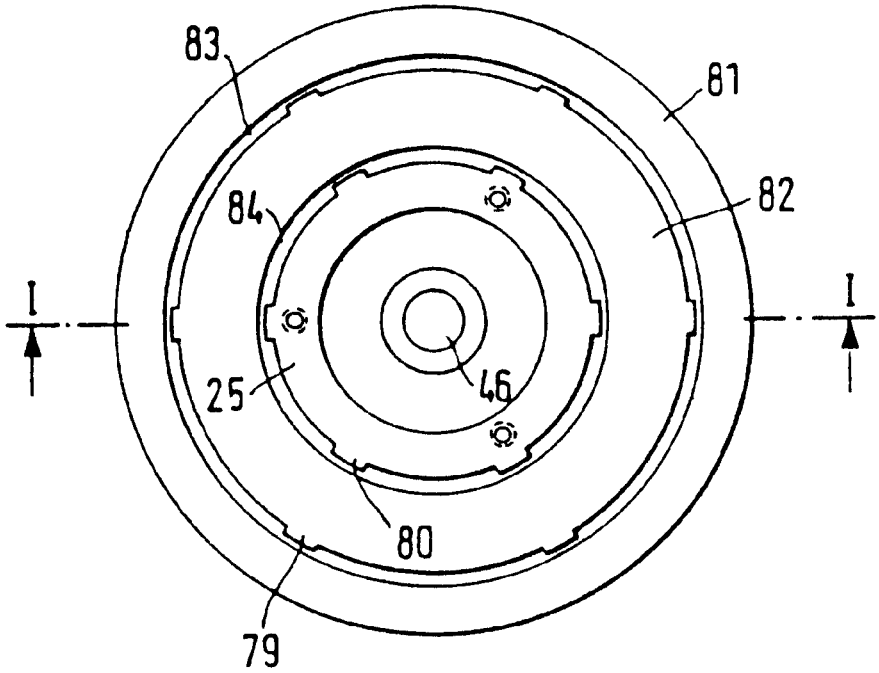
FIG. 2

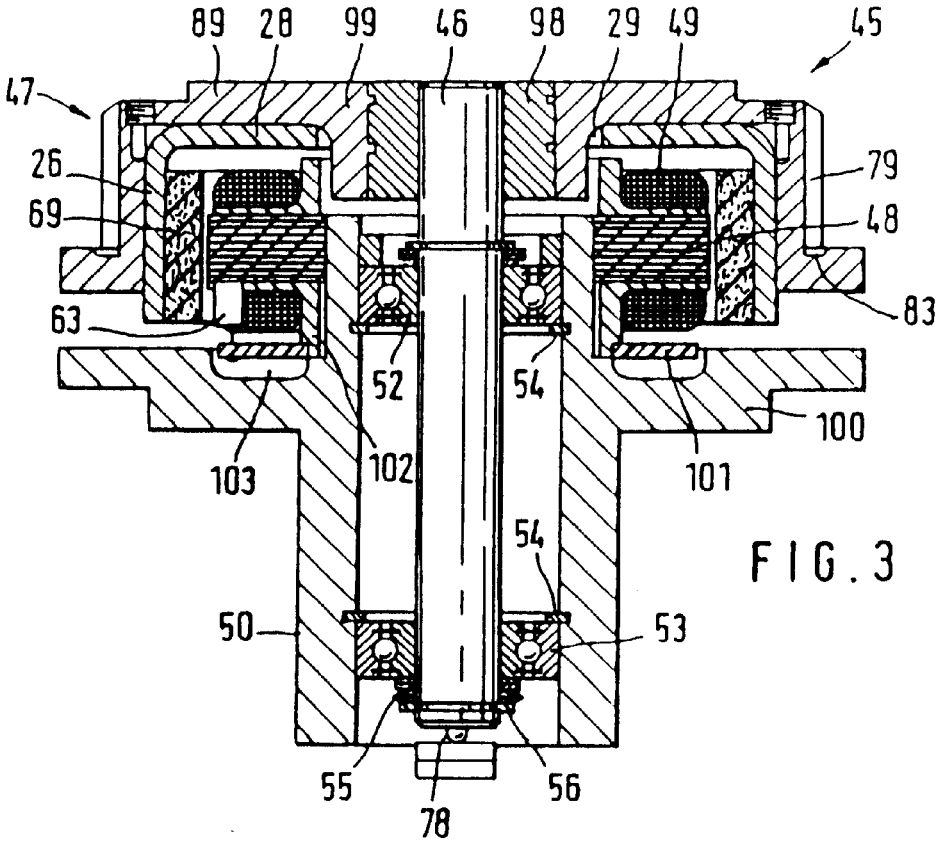
FIG. 3
FIG. 4
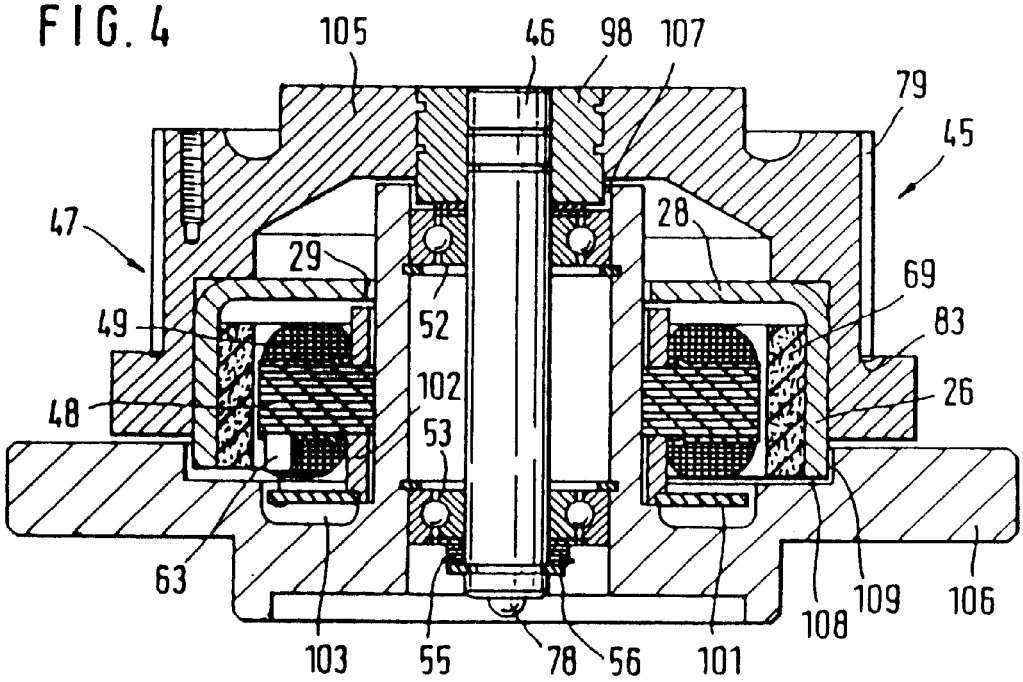

Fig. 11
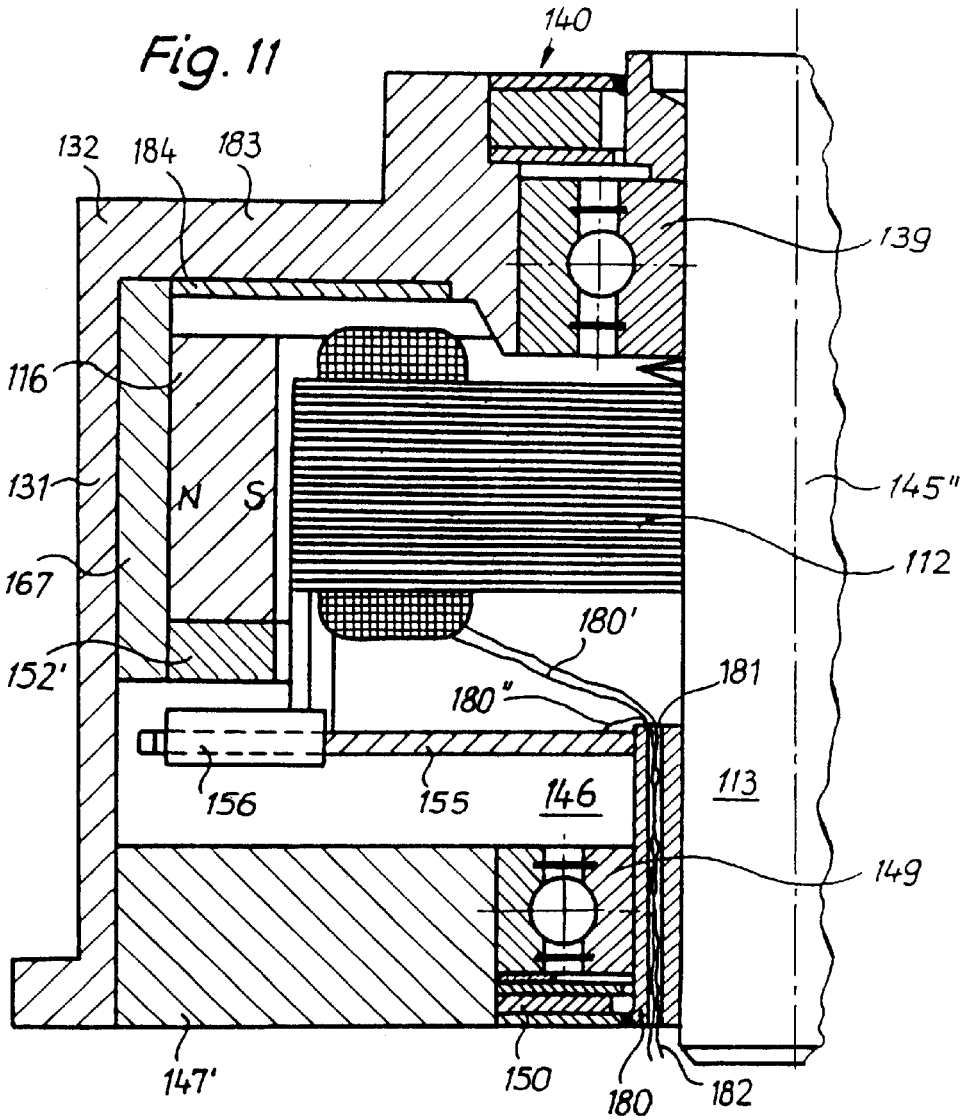
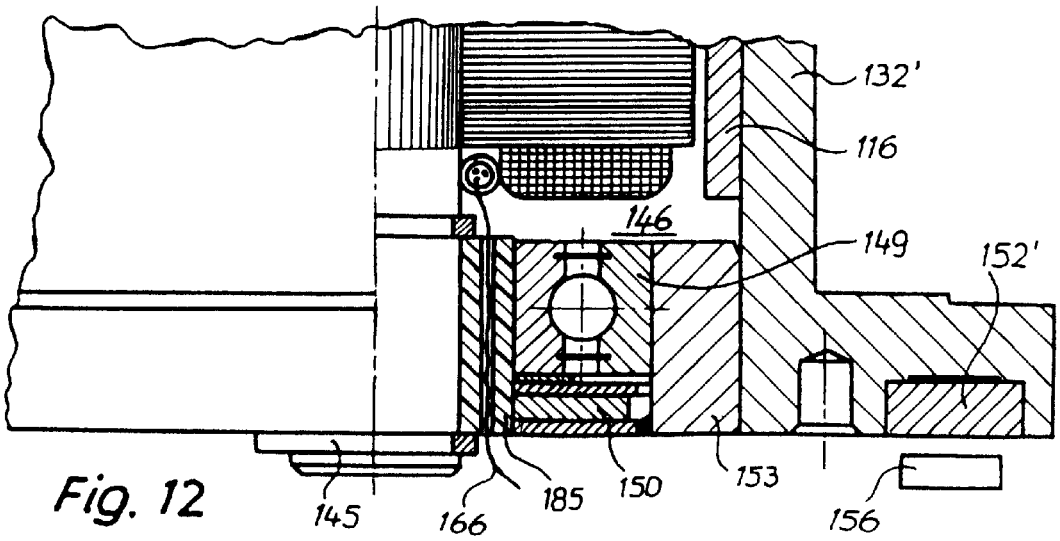
Fig. 12

DISK STORAGE DEVICE HAVING AN UNDERCUT HUB MEMBER

Matter enclosed in heavy brackets [ ] appears in the original patent but forms no part of this reissue specification; matter printed in italics indicates the additions made by reissue.

BACKGROUND OF THE INVENTION

This is a continuation of application *Ser. No. 819,099, filed Mar. 4, 1997, now U.S. Pat. No. Re. 37,058, issued Feb. 20, 2001, which is a continuation of application Ser. No. 360,226, filed Dec. 20, 1994, now abandoned, which is a broadening reissue application of U.S. Pat. No. 5,173,814, issued Dec. 22, 1992 from application Ser. No. 653,100, filed Feb. 8, 1991, said application Ser. No. 653,100 being is a continuation of application* Ser. No. 07/402,917, filed Sep. 5, 1989, now U.S. Pat. No. 5,001,581, issued Mar. 19, 1991, which is a continuation of application Ser. No. 201,736, filed Jun. 2, 1988, [now] U.S. Pat. No. 4,894,738, issued Jan. 16, 1990, *now U.S. Pat. No. Re. 35,792, issued May 12, 1998,* which is a continuation-in-part of application Ser. No. 038,049, filed Apr. 14, 1987, now U.S. Pat. No. 4,843,500, issued Jun. 27, 1989, which is a continuation-in-part of application Ser. No. 767,671, filed Aug. 21, 1985, now U.S. Pat. No. 4,658,312, issued Apr. 14, 1987, which is a continuation of application Ser. No. 412,093, filed Aug. 27, 1982, now abandoned, *which is a continuation-in-part of application Ser. No. 326,559, filed Dec. 2, 1981, now U.S. Pat. No. 4,519,010, issued May 21, 1985, said application Ser. No. 412,093 also being a continuation-in-part of application Ser. No. 244,971, filed Mar. 18, 1981, now abandoned, said application Ser. No. 201,736 also being a continuation-in-part of application Ser. No. 32,954, filed Mar. 31, 1987, U.S. Pat. No. 4,779,165, issued Oct. 18, 1988, now U.S. Pat. No. Re. 34,412, issued Oct. 19, 1993, which is a continuation of application Ser. No. 733,231, filed May 10, 1985, now abandoned, which is a continuation-in-part of the said application Ser. No. 412,093.*

*CROSS-REFERENCE TO RELATED APPLICATIONS*

*A broadening reissue application for U.S. Pat. No. 5,173,814 was filed on Dec. 20, 1994 and assigned Ser. No. 08/360,226. On Mar. 4, 1997, a continuation of this application was filed and was assigned Ser. No. 08/819,099. On Jun. 9, 1999, five continuation applications from the 08/819,099 application were filed. On Nov. 17, 1999, a sixth continuation application from the 819,099 application was filed. These applications, as currently pending, are described below:*

*a) "Disk Storage Device Having A Sealed Bearing Tube" (Ser. No. 09/333,399, now RE 38,662), inventors Elsässer and von der Heide, filed Jun. 9, 1999;*

*b) "Disk Storage Device Having A Radial Magnetic Yoke Feature" (Ser. No. 09/333,338; now RE 38,601), inventors Elsässer, von der Heide, and Müller, filed Jun. 9, 1999;*

*c) "Disk Storage Device Having A Hub Sealing Member Feature" (Ser. No. 09/333,397), inventors Elsässer and von der Heide, filed Jun. 9, 1999;*

*d) "Disk Storage Device Having An Underhub Spindle Motor" (Ser. No. 09/333,396; now RE 38,178), inventors Elsässer, von der Heide, and Müller, filed Jun. 9, 1999;*

*e) "Disk Storage Device Having a Particular Magnetic Yoke Feature" (Ser. No. 09/333,400; now RE 38,179), inventors Elsässer and von der Heide, filed Jun. 9, 1999; and*

*f) "Disk Storage Device Having An Undercut Hub Member" (Ser. No. 09/441,504), inventors Elsässer and von der Heide, filed Nov. 17, 1999.*

The invention relates to a disk storage drive for receiving at least one storage disk having a central opening, with an outer rotor type driving motor having a rotor casing mounted by means of a shaft in a bearing system so as to rotate relative to a stator and on which can be placed the storage disk for driving by the rotor casing, as described in U.S. patent application Ser. No. 353,584, now U.S. Pat. No. 4,438,542, issued Mar. 27, 1984.

The content of this patent is incorporated herein by reference to avoid unnecessary repetition. It relates to a storage drive for receiving at least one storage disk having a central opening. The driving motor extends coaxially at least partly through the central opening of the storage disk, and means are provided for connecting the storage disk and the driving motor rotor.

BRIEF SUMMARY OF THE INVENTION

One problem of the present invention is to further simplify the construction of a disk storage described in the aforementioned U.S. Pat. No. 4,438,542, while improving its operation. For example, the storage disk is to be reliably protected against undesired influencing by the magnetically active parts of the driving motor. In addition, a particularly space-saving and robust construction of the driving motor are to be achieved.

According to the invention, this first problem is solved in that at least the part of the rotor casing receiving the storage disk is made from a non-ferromagnetic material and carries the shaft directly or by means of a hub and in that a magnetic shield made from a ferromagnetic material in the form of a drawn can projects into the storage disk receiving part of the rotor casing and is connected thereto. The shielding surrounds the periphery of the magnetically active parts of the driving motor and also envelops the parts at one end. The shield has a central opening whose edge is directly radially adjacent the shaft or parts of the driving motor carrying or supporting the shaft. A rotor casing constructed in this way can be easily manufactured, and it effectively protects the magnetically sensitive storage disks, particularly magnetic hard storage disks, against magnetic stray flux emanating from the magnetically active parts of the driving motor. The shield is preferably in the form of a deep-drawn can, and the part of the rotor casing receiving the storage disk can be made from a lightweight metal by die casting.

If, in the manner described in the aforementioned U.S. Pat. No. 4,438,542, the driving motor is constructed as a brushless direct current motor with a permanent magnet rotor, then in accordance with a further development of the invention a printed circuit board with at least one rotary position detector and perhaps other electronic components for the control and regulation of the driving motor are mounted on the side of the stator remote from the closed end of the shielding can. This ensures that the rotary position detector and any further circuit components of the magnetic shielding arrangement do not interfere with the rotating parts.

Further advantageous developments of the invention also are disclosed, including features that contribute to a compact construction of the disk storage drive. In connection with disk storage drives of the present type, high demands are made on the concentricity of the storage disks. It is therefore generally necessary to machine the storage disk receiving part or to work it in some other way so that it is dimensionally true. As a result of other features of the invention, the necessary machining is reduced to a relatively small part of the circumferential surface of the storage disk receiving part and a trouble-free engagement of a storage disk on the shoulder of the storage disk receiving part is permitted.

Other features of the invention provide a robust precision mounting support for utilizing the available axial overall length for maximizing the distance between the bearings; and permit particularly large distances between the bearings where the axial installation area between a mounting or assembly flange and the end of the storage disk receiving part is limited. Installation space is available on the other side of this flange. Still other features provide for alternative solutions leading to particularly small radial runouts of the rotor; ensure a space-saving housing of the circuit board; and for solutions where importance is attached to a particularly shallow construction.

In a further development of the invention, a disk storage drive of the type disclosed in U.S. Pat. No. 4,779,165, issued Oct. 18, 1988, *now U.S. Pat. No. Re. 34,412, issued Oct. 19, 1993* is considered. Some such disk storage drives have stationary shafts and a sealed off internal space within the motor.

In the construction of such data storage disk drives with stationary shafts, problems also have arisen in the following areas:

a) Achieving extremely high level of precision required for repeatable shaft runout;
b) Improving the sealing of the clean chamber; and
c) Achieving a and b within acceptable costs.

Yet another purpose of the present invention, therefore, is to provide a further development of the data storage disk drive of the above type having a stationary shaft by providing viable solutions for various combinations of the above problems, such as a and c; b and c; and a, b and c.

If the rotational position sensor device has several rotational position sensors, preferably of the type sensitive to magnetic fields, it is advantageous for these sensors to be supported on a common molded piece, especially if it is made by injection molding. The construction of the molded piece for the accommodation of several rotational position sensors in accordance with the invention simply ensures the precise mutual alignment of these sensors.

If required, the rotary position sensing arrangement can be mounted on a printed circuit board, together with any known type of commutation electronics. This printed circuit board can be supported on a fixed flange or bracket which is, in turn, connected to the shaft through which the connecting leads to the rotary position sensors may be brought out.

The control arrangement, which preferably takes the form of a control magnet device, can be mounted on the outside of a cover which seals off the space inside the motor. This cover may preferably serve as a bearing bracket as well. The control arrangement, however, also can be mounted on a part of the hub at a distance from the disk carrier stage outside the sealed internal space of the motor. A flange which serves to support the data storage disk or disks, may be connected to the remaining hub parts as one piece, or alternatively, this flange may form part of the cover which seals off the internal space of the motor.

In accordance with one variant of the present invention, at least the electric supply leads to the stator windings are brought out of the sealed internal space of the motor over a bearing support ring. This arrangement obviates the need to provide passages in the shaft to accommodate the winding connections. In yet another alternative arrangement, the rotary position sensing arrangement, together with the commutation electronics, if necessary, can both be housed in the sealed internal space of the motor with their leads and connections being brought out over the bearing support ring. In any event, none of the above arrangements requires the provision of passages formed through the stationary shaft, thus avoiding the need to weaken the shaft or to perform additional machining operations in the manufacturing thereof.

The bearing support ring can be a prefabricated component provided with recesses for the passage of the electric leads and connections. Alternatively, the aforesaid connections can be potted in situ inside the bearing support ring.

BRIEF DESCRIPTION OF THE DRAWINGS

The invention is described in greater detail hereinafter relative to non-limitative embodiments and the attached drawings, wherein:

FIG. 1 is a vertical partial sectional view through an embodiment of the invention along the line I—I of FIG. 2;

FIG. 2 is a plan view of the arrangement of FIG. 1;

FIG. 3 is a sectional view through another embodiment of the invention with an extended bearing tube;

FIG. 4 is a sectional view through a further embodiment of the invention;

FIG. 11 is a section through a disk storage drive according to the invention illustrating a rotational position sensor device located inside the sealed internal space of the motor with leads brought out through bearing support ring;

FIG. 12 is a partial section similar to but yet a variant of FIG. 7 of yet another embodiment of the invention having the rotational position sensor device located outside the sealed internal space of the motor;

DETAILED DESCRIPTION OF THE PREFERRED EMBODIMENTS

Figure 5:
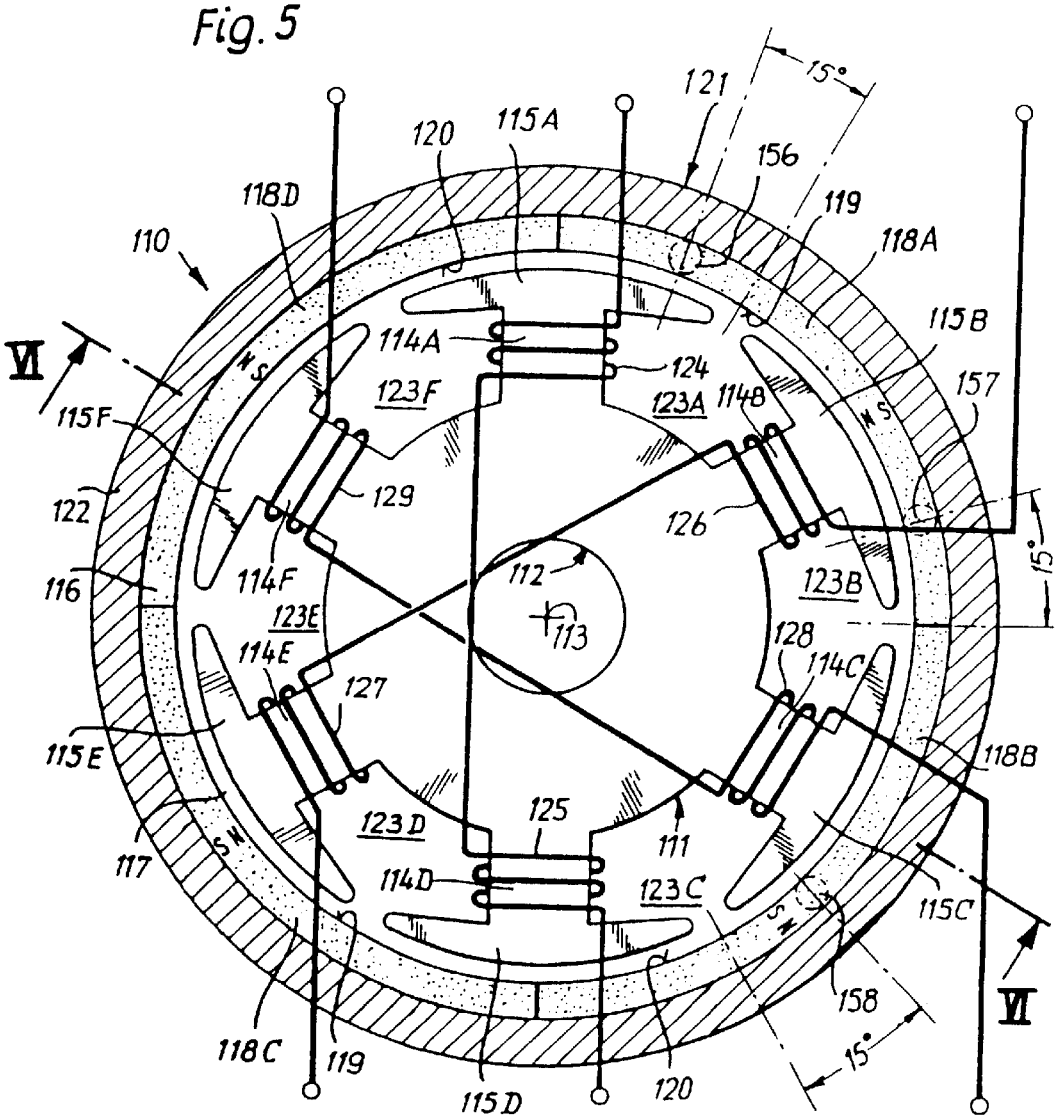
FIG. 5 is a section through a disk storage drive motor, less the hub, according to the invention along line V—V of FIG. 6.

The disk storage drive illustrated in FIG. 1, having an extremely shallow construction, has a brushless direct current motor 45 having a rotor casing 47 fixed to and coaxial with a rotor shaft 46. A stator lamination 48, carrying a stator winding 49, is mounted on a bearing tube 50. The rotor shaft 46 is rotatably mounted within the bearing tube 50 by means of two bearings 52 and 53. These are kept axially spaced by a pair of retaining rings 54. A cup spring 55 is supported on the underside of the bearing 53 by a retaining ring 56 resting on the rotary shaft 46, so that the bearings 52, 53 are axially braced relative to one another. The bearings 52, 53 are pressed into the bearing tube 50 at the time of assembly. Together with an assembly flange 24, the bearing tube 50 forms a one-piece die casting.

The rotor casing 47 comprises a storage disk receiving part 25 and a shielding can 26, which are joined together, for example, by riveting. The storage disk receiving part 25 is made from a non-ferromagnetic material, preferably light-weight metal. The rotor shaft 46 is pressed into a central opening of the storage disk receiving part 25. As an alternative, the shaft can be cast into the receiving part.

The shielding can 26 is made from a ferromagnetic material and can in particular be constructed as a soft iron deep-drawn part. A plurality of permanent magnetic segments or a one-part permanent magnet 69 are fixed to the inner face of shielding can 26 radially facing the stator lamination 48. The permanent magnet 69 preferably comprises a mixture of hard ferrite, for example, barium ferrite, and an elastic material. Thus, it is a so-called rubber magnet. The latter is trapezoidally or approximately trapezoidally radially magnetized via the pole pitch in a motor construction having a relatively small pole clearance. At the same time, the shielding can 26 forms the magnetic return path for magnet 69. The shielding can 26 surrounds the magnetically active parts 48, 49, 69 of the driving motor 45 on the periphery thereof, as well as on one end thereof. The bottom 28 of shielding can 26 is adapted to the shape of the coil winding heads 27 of the stator winding 49 and contains a central opening 29, whose edge is in the immediate radial vicinity of the circumferential surface of the bearing tube 50. In this way, the shielding can effectively prevents the magnetic flux from straying towards the outside of the storage disk receiving part 25.

The storage disk receiving part 25 has two stepped stages 74 and 75, each of whose circumferential surfaces in the present embodiment carry a plurality of radially distributed and projecting bearing webs 79 or 80. The outsides of bearing webs 79, 80 are ground in a dimensionally true manner to accommodate the internal diameter of the hard storage disks to be placed on the receiving part 25. The stepped stages 74, 75 form shoulders 81, 82 and are provided respectively with an annular recess 83 and 84 at the foot axially of bearing webs 79, 80. This structure ensures that storage disks mounted on the bearing webs 79, 80, and having either one of two opening diameters, will cleanly engage against either the shoulder 81 or 82.

The assembly flange 24 is provided with a recess 85 in which is housed a printed circuit board 86. This printed circuit board carries a rotary position detector, for example a Hall IC, as well as other circuit components for the control and regulation of the driving motor 45. The Hall IC 63 extends up axially from the circuit board 86 to the immediate vicinity of the stator lamination 48. The permanent magnet 69 projects axially over the stator lamination 48 in the direction of circuit board 86 until it partly overlaps the Hall IC 63. In this way, the Hall IC 63 or, if desired, some other magnetic field-dependent semi-conductor component, determines the rotary position of the rotor of the driving motor 45.

In the illustrated embodiment, the two bearings 52, 53 are spaced approximately the same axial distance from the axial center of the permanent magnet 69 and the stator lamination 48.

Disk storages are most usually operated in "clean chamber" environments to protect them against contaminants. By means of the assembly flange 24, the storage drive is arranged on a partition (not shown) which separates the ultra-clean area for receiving the storage disks from the remainder of the interior of the equipment. Dirt particles, grease vapors and the like from bearing 52 and parts of the driving motor 45 are prevented from passing into the storage disk receiving area by labyrinth seals 90 and 91. The labyrinth seal 90 is formed in the end of the bearing tube 50 away from the assembly flange 24 that projects into an annular slot 87 on the inside of the storage disk receiving part 25, accompanied by the formation of sealing gaps. Similarly, for forming the labyrinth seal 91, the end of the shield can 26 projects into the annular slot 88 of the assembly flange 24. The labyrinth seals 90, 91 are preferably dimensioned in the manner described in the aforementioned U.S. Pat. No. 4,438,542.

The embodiment of FIG. 3 differs from the arrangement according to FIGS. 1 and 2 in that storage disks having the same opening diameters are placed on bearing webs 79 of a storage disk receiving part 89, which surrounds the majority of the axial dimension of the magnetic shielding can 26. In other words, the magnetically active parts 48, 49, 69 of the driving motor 45 are partially located within the central opening of the storage disk. A bush-like hub 98 is pressed or cast into the storage disk receiving part 89. The rotor shaft 46 is then pressed into the hub 98. The edge of the central opening 29 in the bottom 28 of the shielding can 26 extends up to the portion 99 of the receiving part 89 which received the hub 98.

The bearing tube 50 projects in the axial direction on the side of the assembly flange 100 remote from the stator lamination 48. As a result, a particularly large axial spacing between the two bearings 52, 53 can be achieved. Axially, bearing 52 is in the vicinity of the axial center of the permanent magnet 69 and of the stator lamination 48. The axial spacing between bearings 52 and 53 is equal to or larger than double the bearing external diameter. To prevent electrical charging of the rotor which in operation rotates at high speed and which would disturb the operational reliability of the disk storage device, the rotor shaft 46 is electrically conductively connected to the equipment chassis by means of a bearing ball 78 and a spring contact (not shown). The printed circuit board 101, carrying the rotary position detector 63 and the other electronic components, is supported on the end of a spacer ring 102 facing an assembly flange 100 and is located between the flange and the stator lamination 48. An annular slot 103 is formed in assembly flange 100 and is aligned with the annular circuit board 101. The annular slot 103 provides space for receiving the wire ends and soldered connections projecting from the underside of the circuit board 101.

FIG. 4 shows an embodiment in which a storage disk receiving part 105 is axially extended in order to be able to house a larger number of storage disks than in the arrangement of FIG. 3. The bearing tube 50 is correspondingly axially extended in order to be able to use the existing installation space with a view to a maximum axial spacing between the bearings 52 and 53. The end of the bearing tube 50, remote from an assembly flange 106, embraces the hub 98 connecting the receiving part 105 and the shaft 46, accompanied by the formation of a labyrinth seal 107. The edge of the central opening 29 of shielding can 26 extends up close to the outside of the bearing tube 50. The free end of the shielding can 26 engages a recess 108 in the assembly flange 106. As a result, a further labyrinth seal 109 is formed. This embodiment otherwise corresponds to the structures already described herein.

Figure 6:
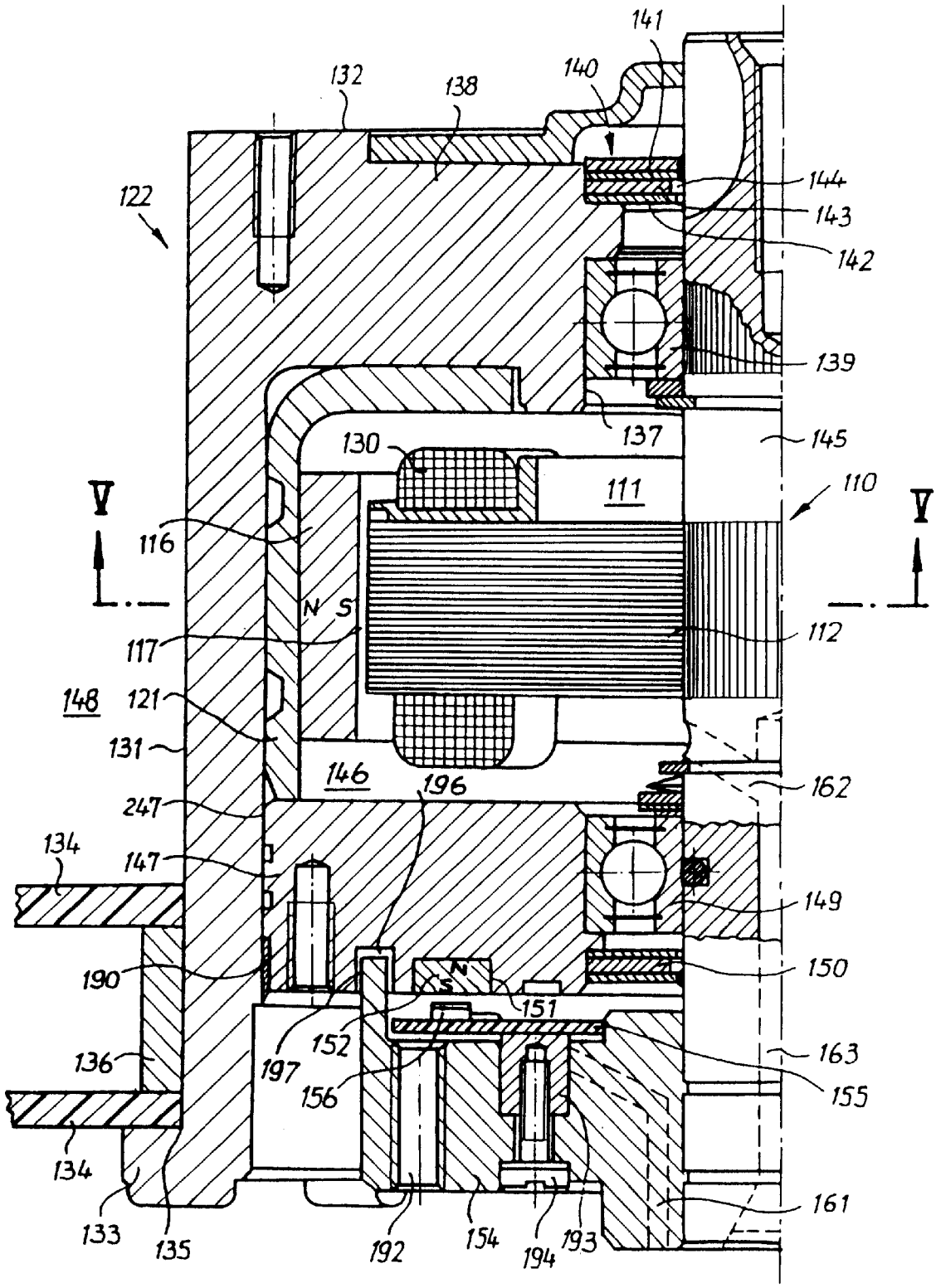
FIG. 6 is a section along line VI—VI of FIG. 5 and illustrating a rotational position sensor device located outside the sealed internal space of the motor.

In FIGS. 5 and 6, a brushless drive motor, designated as 110 has a stator 111 with a stator lamination stack 112. The stator lamination stack 112 is arranged radially and symmetrically with respect to a central axis of rotation 113 and forms six stator poles 114A to 114F in an essentially T-shaped configuration as seen from above in accordance with FIG. 5, which poles are positioned at regular angular intervals of 60°. Instead of one lamination stack, for example, a sintered iron core can also be provided. Pole shoes 115A to 115F, together with a permanent magnetic rotor magnet 116 define an essentially cylindrical air gap 117. The rotor magnet 116 is radially magnetized in four poles around its periphery as indicated in FIG. 5; that is to say, it has four sections 118A to 118D, and, on the internal side of the annular rotor magnet 116 toward the air gap 117 there are positioned, in alternating sequence, two magnetic north poles 119 and two magnetic south poles 120. The poles 119, 120 have, in the example depicted, a width of substantially 180°-el (corresponding to 90° mechanical). Thus, in the circumferential direction of the air gap 117, an approximately rectangular or trapezoidal magnetization is obtained. The rotor magnet 116 is mounted, typically by bonding, in an outer rotor casing or bell 121 of soft magnetic material, preferably steel, which serves both as a magnetic return path and as a magnetic shield. The casing 121 and the magnet 116 together form an external rotor 122. The rotor magnet 116 can include in particular a rubberized magnetic unit, or a plastic-bound magnet. Instead of a single-piece magnetic ring, curved magnetic segments can also be bonded or otherwise attached in the casing 121. Magnetic materials made from synthetic bonding compounds, a mixture of hard ferrite and elastomers, ceramic magnetic materials or samarium cobalt are all particularly suitable as materials for the magnetic ring or segments.

The stator poles 114A to 114F abut a total of six stator slots 123A to 123F. A three-phase stator winding is inserted into these slots. Each of the three phases comprises two 1200°-el fractional pitch windings or coils 124, 125; 126, 127; and 128, 129, each of which is wound around one of the stator poles 114A to 114F. Both of the coils of each phase, which are connected in series, lie, as depicted in FIG. 5, in a diametrically opposed manner and are preferably bifilar wound. As can be seen from the schematic depiction in FIG. 5, any overlapping between the coils 124 to 129 is avoided. This arrangement allows the end turns of the windings 130 (FIG. 6) to be kept as short as possible. In this embodiment of the present invention, optimal filling of the stator slots 123A–123F by the windings is achieved. Fasteners are generally not required to close the slot openings.

A hub 132, not depicted in FIG. 5, is provided with a cylindrical disk mounting section 131 and preferably is made of a light metal, especially aluminum or an aluminum alloy. It is mounted on the outer rotor casing 121. One or more storage disks 134, preferably magnetic or optical fixed storage disks, are provided on the disk mounting section 131, whereby the disk mounting section 131 extends through the conventional central aperture 135 of the storage disks. The lowest storage disk in FIG. 6 is located on a flange 133 of the hub 132 projecting radially outwardly. The data storage disks 134 can be maintained at an axial distance from each other by suitable spacers 136 and are secured to the hub 133 by means of a tightening device, not depicted, of a known type. In the embodiment shown in FIG. 6, the stator 111, the stator stack 112 and the stator winding (coils 124 through 129) as well as the rotor magnet 116 and the outer rotor casing 121 forming the iron shield, are all completely encompassed within the space occupied by the storage disk stage 131 on the hub 132.

In a central aperture 137 of a frontal wall 138 of the hub 132, which is relatively heavy for reasons of stability, are a ball bearing 139 and a magnetic fluid seal 140 on the side of the support which is axially oriented away from the drive motor 110. The seal 140 consists of two annular pole pieces 141, 142, a permanent magnet ring 143 located between both these pole pieces, and a magnetic fluid (not shown), which is inserted into an annular gap 144 between the magnetic ring 143 and a stationary shaft 145. Seals of this type are known under the designation of "Ferrofluidic Seal". An internal space 146 is located within the motor and is sealed on the side of the space oriented away from the frontal wall 138 by means of a motor cover 147, which is inserted into the outer rotor casing 121 and the hub 132, by means, for example, of adhesion. The internal space 146 includes the internal parts such as the stator 111 and permanent magnet 116 as well as bearings 139 and 149. The motor cover 147 abuts with its cylindrical outer edge 247 the lower edge of the rotor casing 121. This allows a particularly easy assembling of the cover 147 within the hub 132. For sealing purposes, adhesive material 190 is placed in a circumferential groove 191 between the cover 147 and the hub 132.

The motor cover 147 is supported on the shaft 145 by means of an additional ball bearing 149. On the side of the ball bearing 149 away from the drive motor 110, there is a magnetic fluid seal 150, which has a construction corresponding to the seal 140. The seals 140, 150 ensure an effective sealing of the motor internal space 146, including the bearings 139, 149, relative to a clean chamber 148 which accommodates the storage disks 134.

The motor cover 147 is provided on the frontal side facing away from the drive motor 110 with an annular groove 151 receiving a control magnet ring 152. The control magnet ring 152 has four sections of alternating circumferential magnetization corresponding to the rotor magnets 116, which run in sequence in the circumferential direction and extend over 90°, so that alternating north and south poles, aligned with poles 119, 120 in the circumferential direction, are provided on the bottom side of the control magnetic ring 152.

A stationary flange 154 is disposed on the lower end of the shaft 145 in FIG. 6. The flange 154 is provided with threaded bores 192 for receiving fastening screws by which the disk storage drive may be connected to the disk drive frame, for example, over a wall delimiting the clean chamber 148, or the like. The flange 154 supports a printed circuit board 155 on its frontal side relative to the motor cover 147. Three rotational position sensors 156, 157, 158 are mounted on the printed circuit board 155. In the embodiment shown, these magnetic field sensors may be Hall generators, Hall-IC's, magnetically controlled photocells, magnetic diodes, or the like, which interact with the control magnet ring 152. The rotational position sensors 156, 157, 158 are suitably positioned in the circumferential direction with regard to the coils 124 to 129 so that the changes of the sensor switching conditions essentially coincide with the zero passages of current in the correspondingly positioned coils. This is attained, in accordance with the embodiment shown in FIG. 5, through the fact that the rotational position sensors are displaced by 15-mech with respect to the center of the apertures of the stator slots 123A to 123F. The rotational position sensors 156, 157, 158 may be supported by a common molded part 159 (see, for example, FIG. 14), preferably a plastic injection molded part. By using a common molded part 159 as the support for the rotational position sensors, their relative positioning with respect to one another can be maintained and reproduced in a particularly precise manner. The printed circuit board 155 is fixed to a ring 193 and is tightly pulled against the flange 154 by screws 194 screwed into a ring 193. An upwardly projecting outer rim 195 of flange 154 defines a hollow cylinder extending into an annular groove 196 provided in the bottom side of the flange 154. Thereby a labyrinth gap 197 is formed which provides for additional sealing between the stationary flange 154 and the rotary motor cover 147.

The connections of the rotational position sensors 156, 157, 158 and/or commutational electronics likewise positioned on the printed circuit board are conducted through one or more apertures 161 of the flange 154 which open into peripheral cutouts of the ring 193. The connections of the stator winding coils 124 to 129 of the drive motor 110 are, on the other hand, conducted outwardly through bores 162, 163 of the stationary shaft 145 out of the internal space of the disk storage drive, which is sealed off by means of the magnetic fluid seals 140, 150. The bores 162, 163 can be dimensioned relatively narrowly, because they only have to accommodate the connections of the stator winding but not the connections of the rotational position sensors and/or the commutation electronics (not shown). Furthermore, the rotational position sensors 156 to 158 located outside of the sealed space 146 can be closely adjusted. An excessive weakening of the shaft 145 is thereby avoided.

Figure 7:
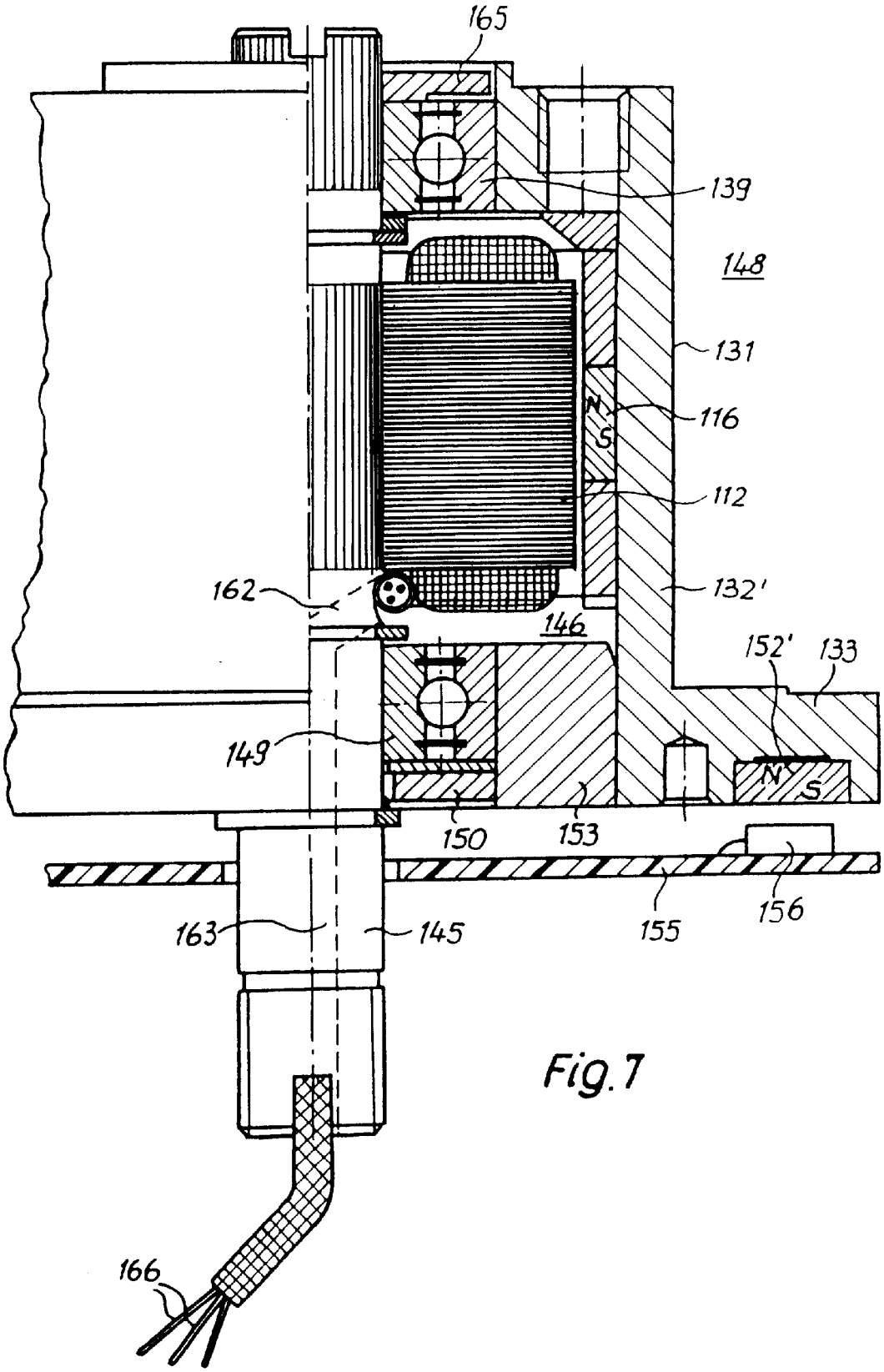
FIG. 7 is a section similar to FIG. 6 of a modified embodiment of the invention.

In a further modified embodiment shown in FIG. 7, the rotor magnet 116 is located directly within the hub 132', which itself forms the magnetic shield, and is made of magnetically conductive material, preferably soft iron. The control magnet ring 152' is located on the frontal side of the flange 133 facing away from the disk mounting section 131 of the hub 132', and alternately magnetized in the axial direction. In this embodiment, the rotational position sensors 156, 157, 158 are axially opposed to the control magnet ring 152'. The magnetic fluid seal 150 ensures, together with a labyrinth seal 165 which replaces the magnetic fluid seal 140 of the embodiment in FIG. 6, the sealing of the internal space 146, including the bearings 139, 149 relative to the clean chamber 148. The connections of the stator winding 166 are conducted through the bores 162, 163 of the stationary shaft 145. It should be understood that, even in this embodiment, the rotational position sensors 156, 157, 158, can, if desired, be accommodated by a common support corresponding to the molded part 159 (FIG. 14), which support is attached to the printed circuit board 155.

If it is desirable to manufacture the hub 132' from magnetically non-conducting, or poorly conducting, materials, such as light metal or alloy, a separate iron shield can be provided. This can be seen in the embodiment in FIG. 8. There, the rotor magnet 116 is accommodated in an iron shielding ring 167. The flange 169 supporting the storage disk 134 forms a part, separated from the hub 132", of the cover 170 which accommodates the ball bearing 149. The hub 132" and the cover 170 are closely connected with one another, so that the axial end section of the hub 132", which extends towards the cover 170, engages in an annular groove 171 of the cover 170.

Figure 9:
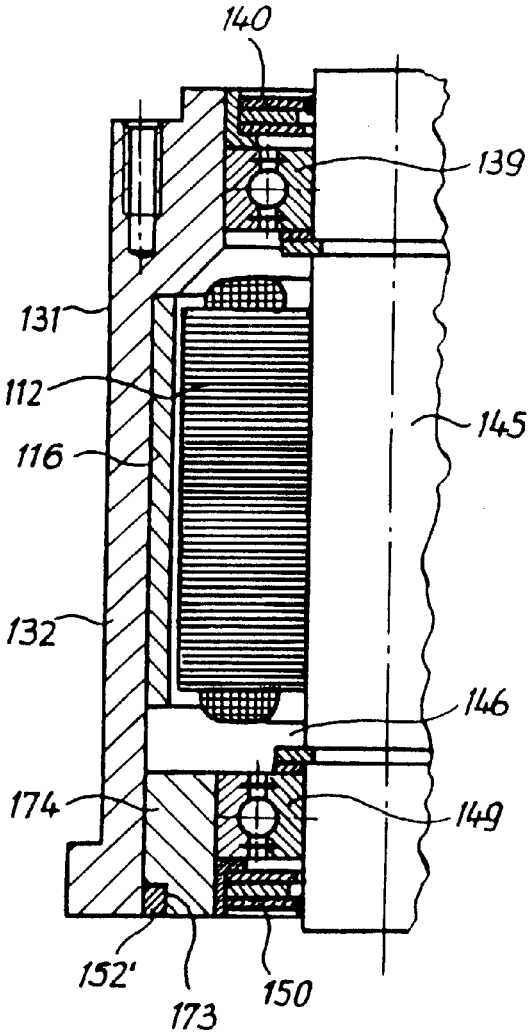
FIG. 9 is a section similar to FIG. 6 of yet another modified embodiment of the invention.
Figure 10:
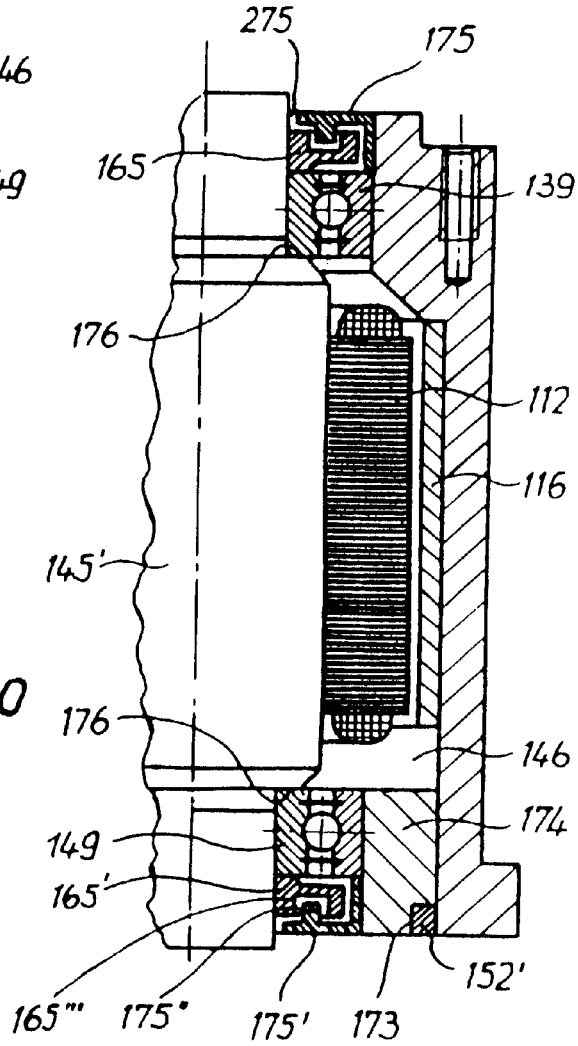
FIG. 10 is a section similar to FIG. 6 of yet another embodiment of the invention.

In both embodiments of FIGS. 9 and 10, the control magnet ring 152' is located in a groove 173 of a bearing support ring 174 on the end of the hub 132. The hub 132 itself forms the magnetic shield, and is accordingly made from conductive material, particularly steel. The control magnet ring 152' interacts, as shown in FIG. 7, with the rotational position sensors 156, 157, 158, which are not shown in FIGS. 9 and 10. In the embodiment in FIG. 9, the internal space 146 is sealed off by means of the magnetic fluid seals 140, 150, but in the embodiment in FIG. 10, labyrinth seals 175 are provided in their place. The embodiment of FIG. 10 further differs from that of FIG. 9 by the stationary shaft 145' in the area where it supports the stator lamination stack 112, and the area directly adjoining the same axially, being axially thickened so that the shaft 145 forms shoulders 176, on which the ball bearings 139, 149 are supported.

Figure 8:
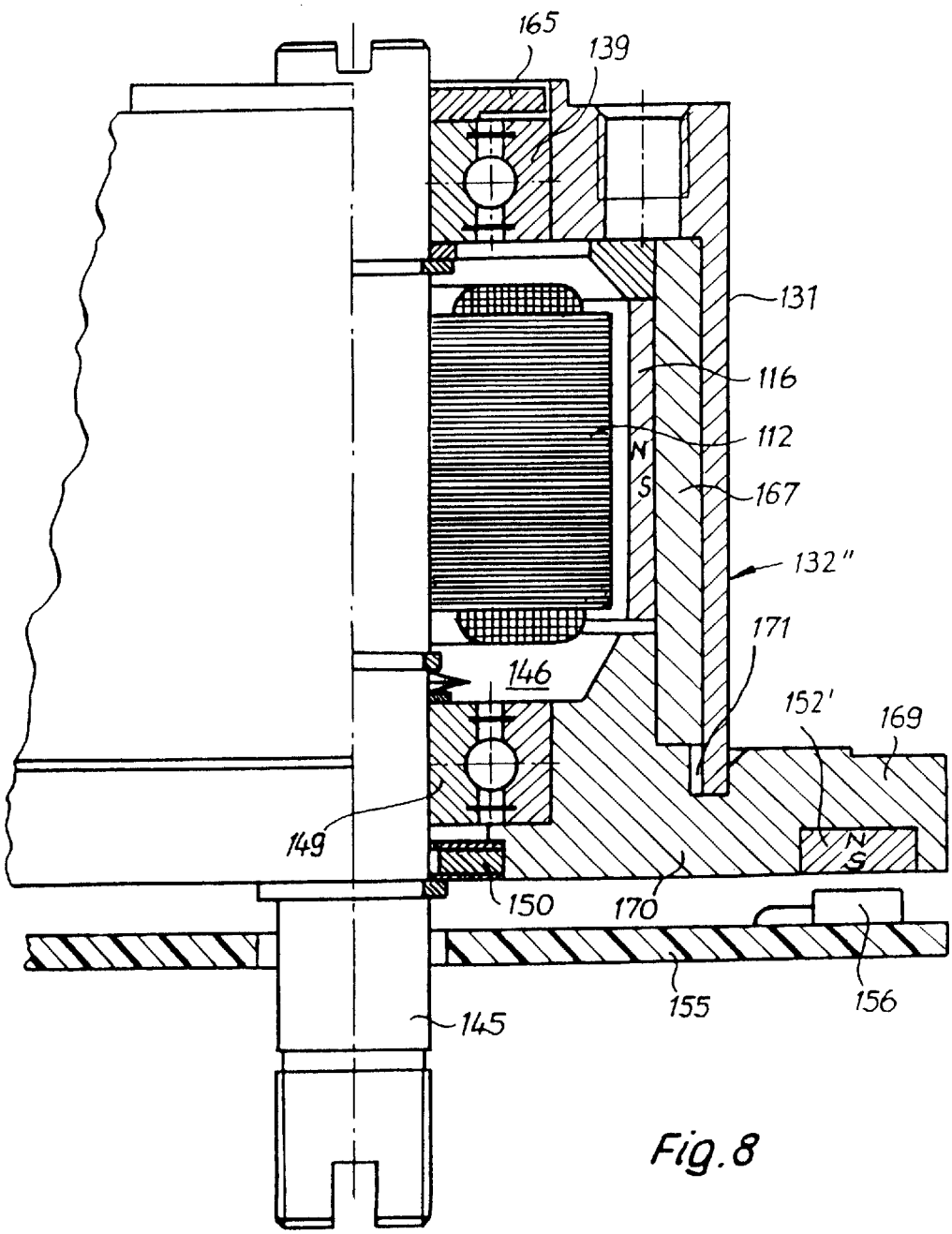
FIG. 8 is a section similar to FIG. 6 of another modified embodiment of the invention.

In the embodiments shown in FIGS. 8, 9, and 10, the connections of the stator winding are, in a manner preferably corresponding to the embodiments shown in FIGS. 6 and 7, brought out externally through recesses of the shafts 145 and 145'.

FIG. 11 depicts an embodiment similar to that of FIG. 11 of copending U.S. Ser. No. 733,231, in which a soft magnetic yoke ring 167 is inserted in the hub 132, the latter forming a disk mounting section 132 and preferably being made of light metal. Both the rotor magnet 116 and the control magnet 152' are accommodated in the inner circumference of the yoke ring 167. In this embodiment, the printed circuit board 155 together with the rotational position sensors 156, 157, 158 are located within the space 146 sealed by the magnetic fluid seals 140, 150. The circuit board 155 may be suspended from the stator lamination stack 112 by supports 178. A bearing support ring 180 is provided for bringing outwardly the connections 180' of the stator winding as well as the connections 180" of the rotational position sensors 156, 157, 158 and/or of the electronic commutating means which likewise may be mounted on the printed circuit board 155. The support ring 180 is made of the soft magnetic material, preferably ferromagnetic metal, and surrounds and is firmly fixed to shaft 145". The ball bearing 149 and the magnetic fluid seal 150 are disposed between the cover 147' and the support ring 180. At least one and preferably a plurality of axially extending apertures 181 are provided in the support ring 180 for receiving the aforementioned connections. After introduction of the connections therein, which together are indicated at 182, the apertures 181 are sealed, e.g. by a potting compound or a mastic. This embodiment completely avoids bores in the stationary shaft 145" and therefore the solid shaft retains its full strength. The provision of a bearing support ring 180 provides for a particularly small eccentricity or run-out of the rotating members. A soft magnetic shield ring 184 is provided on the inside of the frontal wall 183 of the hub 132.

The embodiment of FIG. 12 corresponds to that of FIG. 7 with the exception that a connection 166 of the stator winding extends through a bearing support ring 185 rather than through the bores in the stationary shaft 145. The ring 185 surrounds the lower portion of the shaft 145. The ball bearing 149 and magnetic fluid seal 150 are disposed in the annular space between the support ring 185 and the ferromagnetic ring 153, which is inserted into hub 132'.

In an embodiment where the rotary position sensors are located externally, the winding leads can also be brought out through an inner bearing support ring encompassing the bearing 149, corresponding to the support ring 180 in FIG. 11. Furthermore, in an embodiment provided with an inboard rotary position sensing arrangment similar to that shown in FIG. 11, a bearing support ring 185 according to FIG. 12 mounted on the stationary shaft 145 and supporting the ball bearing 149 on the inside can be used to bring the connections out to the exterior.

The metal support ring 185 according to FIG. 12 ensures that the rotating parts will display particularly limited runout. The magnetic field of the magnetic liquid seal 150 can be contained in either the ferromagnetic support ring 185 or the ferromagnetic ring 153.

Instead of providing the bearing support rings 180 or 185 with apertures through which the connections can be brought out, the connections can also be potted in the bearing support ring directly.

Figure 13:
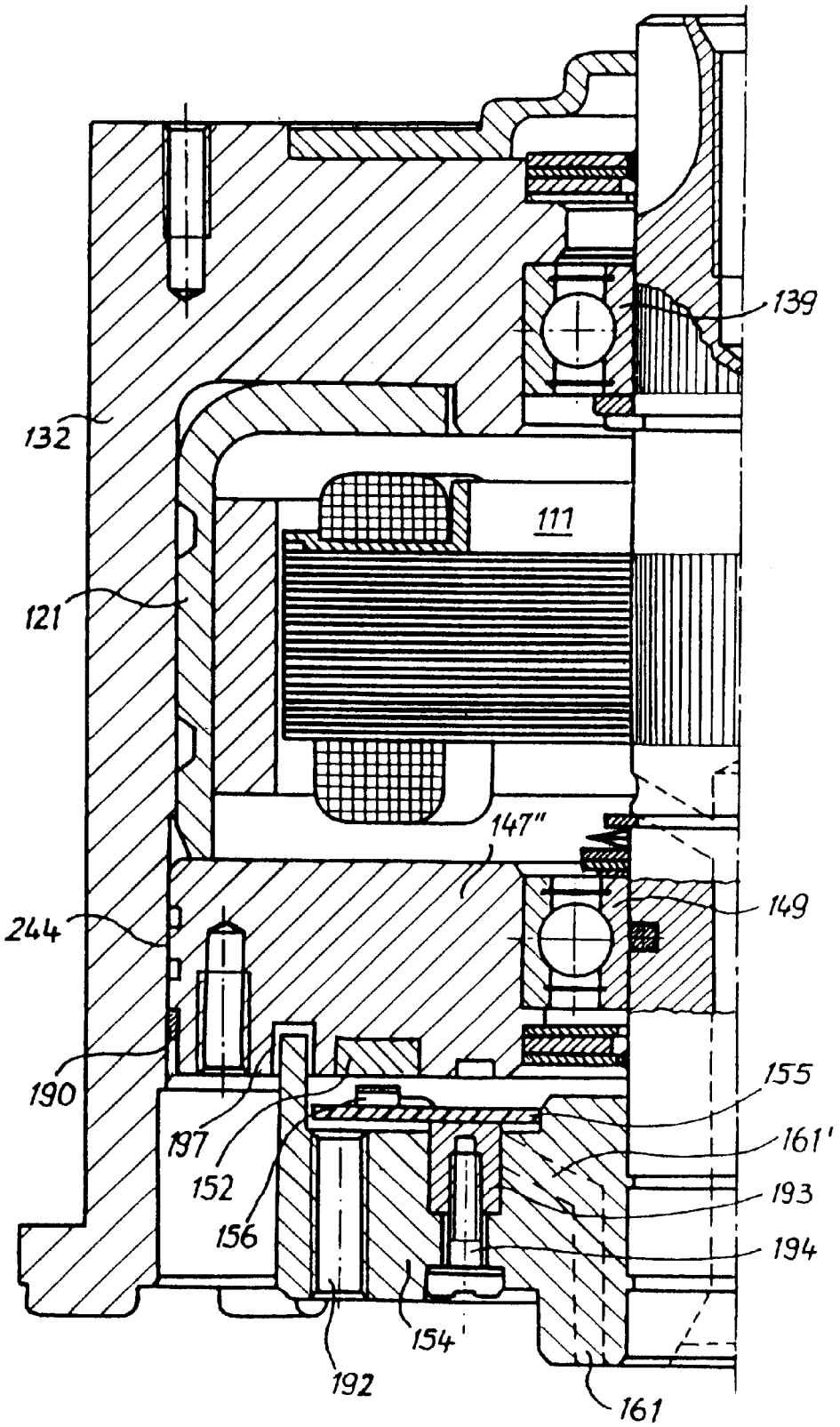
FIG. 13 is a section illustrating a further variant of the embodiment shown in FIG. 6.

FIG. 13 shows an embodiment similar to that shown in FIG. 6, of which it is only a further development in many respects.

A particular feature of this further embodiment is the provision of a flat air gap between rotational position indicator or magnetic control ring 152 and the rotational position sensor 156. The printed circuit board 155 is firmly fastened to a stationary flange part 154 with the screw 194. The outside edge of this flange 154 engages in a disk-shaped ring member 147", which may be the motor cover 147 (FIG. 6) in an axial direction like a hollow cylinder, so as to provide a labyrinth gap 197 acting as an additional seal between the stationary flange 154 and the disk-shaped ring member 147". The lower edge of the soft iron outer rotor casing 121 bears on the rotating ring member 147" whose cylindrical outer edge 244 is more easily inserted in the hub body 132 than the arrangement shown in FIG. 6. A mastic 190 is used as the sealant in a peripheral groove between the ring member 147" and the hub 132.

From the user's point of view, the entire motor assembly is fastened by use of appropriate fasteners in the hole 192. The connecting leads from the printed circuit board 155 to the rotational position sensor 156 are brought out through the passage or bore 161 shown with the disked lines, which extends outwardly from an oblique channel 161' until it terminates in the peripheral apertures in the ring 193 which is brought to bear on the flange 154 by a screw 194.

The ring member 147" corresponds to the elements described in the various embodiments and examples as the covers 170, 147, 147' and the rings 53, 74. Preferably, therefore, only 2 parts are needed to completely enclose the inner space 146 of the motor other than the stationary shaft 145 and the bearings 139, 149; namely, the rotor casing 132 and the disk-shaped ring member 147".

FIG. 10 shows a ring 175, somewhat L-shaped in section, which rotates together with the outer rotor of the hub, whereby the ring 175 encompasses an inner, essentially complementary mating part 165, so that the longer leg of the outside part 175 is only separated from the stationary shaft by a narrow gap 275. In combination with the inside mating part 165, this arrangement provides an effective labyrinth seal. This is referenced item 175' in the lower part of FIG. 10, where the basic L-shaped section of the seal is indicated by a solid line and the complementary mating section is referenced 165'. The effectiveness of the labyrinth seal can be enhanced if a projection 175" on the part 175 is provided to project into a recess 165'", of the complementary part 165'. The arrangement may be seen also in the upper part of the drawing. In this way, the need to use a substantially more costly magnetic liquid seal of the type shown in FIG. 9 as items 140 and 150, can be avoided. Of course, the incorporation of a labyrinth seal of this type provided with these two interlocking L-shaped leg profiles has an independent significance in connection with data storage disk drives and is not required by the other design features of this motor. As already mentioned, the additional recesses 165'" provide further enhancement of the sealing action of the labyrinth seals. Elements of this type are manufactured as large volume extrusions or deep drawn die pressings and their cost hardly bears comparison with that of magnetic liquid seals. They provide a good low-cost means of the sealing of the clean chamber, because they can be installed at the points of access to the space inside the motor, either in an axial direction or otherwise.

Figure 14:
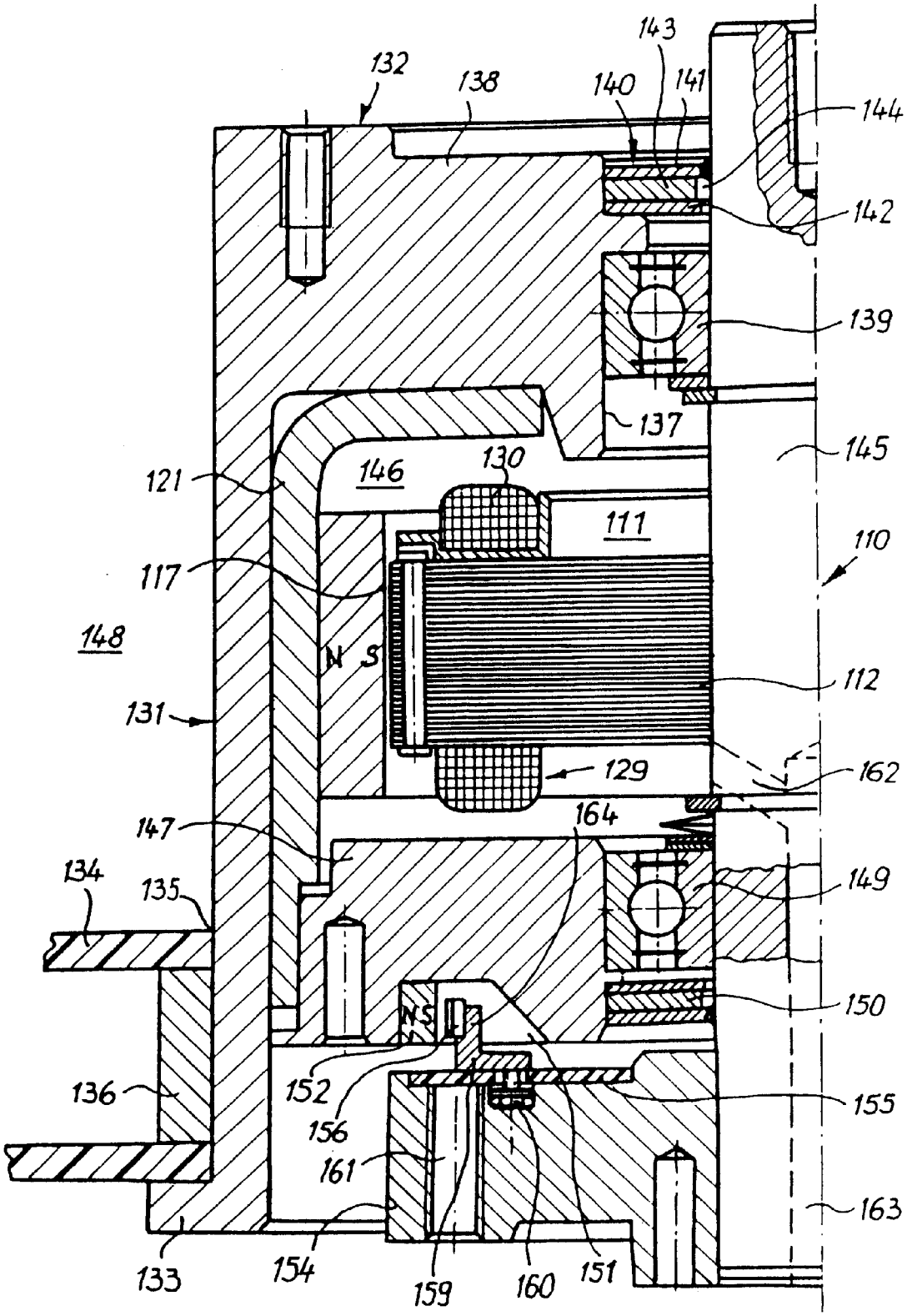
FIG. 14 is a section illustrating yet another variant of the embodiment shown in FIG. 6.

FIG. 14 is a variant of FIG. 6 primarily in the provision of the groove 151 in the motor cover 147 which receives the magnet ring 152 and allows the rotational position sensor 156 to face the magnet ring across a cylindrical air gap vis-a-vis a planar gap in the embodiment shown in FIG. 6.

This invention is not restricted to the use of magnetic field-sensitive rotational position sensors. It can also be used, for example, with optical sensors.

Although the invention has been described in connection with a preferred embodiment and certain alternatives, other alternatives, modifications, and variations may be apparent to those skilled in the art in view of the foregoing description. Accordingly, it is intended to embrace all such alternatives, modifications, and variations as fall within the spirit and scope of the appended claims.

What is claimed is:

[1. A disk memory drive comprising: a brushless drive motor having an internal space defined therein and a stator including winding means defining magnetically active parts of the drive motor and having a given axial extension, the motor having an outer rotor with an inner circumference, an outer circumference and an open end coaxially encircling the stator and a substantially cylindrical air gap defined between the stator and the rotor, the rotor including a separate non ferromagnetic hub and a soft iron ring element interiorly of said hub and radially located means forming a permanent magnet interiorly of said ring having a predetermined axial extension fixedly connected therewith for magnetic interaction with said winding means; a disk mounting section provided on the outside of said hub for accommodating at least one storage disk for location in a clean chamber surrounding said rotor when the drive motor is mounted for operation, the disk mounting section on the hub along its axial length being adapted to extend through a central aperture of the storage disk, the winding means and the magnet means interacting therewith being disposed for at least half of the axial extension thereof within a space surrounded by the disk mounting section of the hub; and first and second axially separated bearing means having inner and outer races on a shaft rotatably mounting the rotor and the hub on the shaft, the motor also including rotating means interacting with stationary means for determining the rotational position of the rotor, the internal space of said motor, which includes the internal portions thereof with the bearing means, being sealed off against the clean chamber when the drive motor is mounted for operation, a disk-shaped ring member being located with precision at the open end of the rotor between the inner circumference of the rotor and the outer race of one of the axially separated bearing means, and means stationary containing leads establishing electrical connection between the internal space and the outside of the motor.]

[2. A disk memory drive according to claim 1, wherein said rotating means interacting with said stationary means comprises rotational position indicator means which includes permanent magnet poles disposed on the disk-shaped ring member for rotation therewith and wherein the rotational position sensor means is sensitive to magnetic fields and interacts with the permanent magnet poles.]

[3. A disk memory drive according to claim 2, wherein the shaft is a stationary shaft.]

[4. A disk memory drive according to claim 3 wherein the rotational position sensor means is mounted on a printed circuit board opposite the disk-shaped member ring.]

[5. A disk memory drive according to claim 4, further including electronic commutation devices for the electromagnetization of the stator also being mounted on the printed circuit board.]

[6. A disk memory drive according to claim 4, wherein the printed circuit board is supported on a flange fixed to the stationary shaft.]

[7. A disk memory drive according to claim 3, further including a magnetic shield means at least circumferentially surrounding the stator for shielding a clean chamber containing the disk from the magnetic flux of the stator and wherein the stationary shaft is of constant diameter and the outer rotor includes a bell-shaped housing with a substantially closed end and a substantially open end, the stator together with the magnetic shield being firmly mounted to the stationary shaft, the inner race of each bearing being firmly mounted on the stationary shaft on either axial side of the stator, the upper bearing being positioned inwardly adjacent of the closed end of the bell-shaped outer rotor, and the lower bearing being positioned adjacent the open end of the bell-shaped outer rotor.]

[8. A disk memory drive according to claim 2, wherein the internal space of the motor is sealed by means of a cover located at the open end of the outer rotor, the cover also serving as a bearing mounting flange, and the rotational position indicator means being mounted on the oustide of the motor cover with respect to the sealed inner space of the motor.]

[9. A disk memory drive according to claim 2, wherein the outer rotor includes an outer rotor casing of ferromagnetic material, the outer rotor serving also as the hub, the rotational position indicator being mounted on a lower part of the hub outside the sealed inner space of the motor.]

[10. A disk memory drive according to claim 2, wherein further comprising a bearing mounting flange having projections in the actual axial direction that project into the disk-shaped ring member, and a labyrinth seal located between the projections and the ring member formed by a combination of cylindrical and radially flat gaps having only dimensions of normal clearances between moving parts.]

[11. A disk memory drive according to claim 10, wherein the projections on the bearing mounting flange are rectangular in section and extend axially.]

[12. A disk memory drive according to claim 10, wherein the ring member on which part of the bearing race is mounted is substantially flush in the axial direction with the mounting flange, the ring member being inserted in the outer rotor casing that forms the hub.]

[13. A disk memory drive having a brushless drive motor, comprising a stator having a predetermined axial extension, a coaxially positioned outer rotor encircling the stator and defining therebetween a substantially cylindrical air gap, the rotor having an inner circumference and an outer circumference and a predetermined axial extension, a cylindrically shaped permanent magnet having a predetermined axial extension disposed adjacent the air gap on the inner circumference of the rotor to rotate therewith and magnetically interact with the stator, a ferromagnetic hub on the outer circumference of the rotor firmly fixed to the motor magnet, the hub radially surrounding the predetermined axial extension of said permanent magnet and being provided on its outer circumference with a disk mounting section which can extend through the central opening in a storage disk to mount at least one storage disk thereon, a shaft having first and second axially separated bearing means mounted thereon rotatably mounting the rotor with hub on the shaft, and seals located axially outside of the axial extension of the first and second bearing means for sealing the space therebetween.]

[14. A disk memory drive according to claim 13, wherein the shaft is a stationary shaft.]

[15. A disk memory drive according to claim 14, wherein the seals are magnetic liquid seals.]

[16. A disk memory drive according to claim 14, wherein the seals are labyrinth seals.]

[17. A disk memory drive according to claim 14, wherein the stationary shaft projects axially externally of the upper and lower seals.]

[18. A disk memory drive according to claim 14, wherein the labyrinth seal is formed of a member having a substantially L-shaped cross section, being mounted on and extending radially from the stationary shaft, the short leg of the L-shaped member extending axially outwardly.]

[19. A disk memory drive according to claim 16, further including a ring member of L-shaped cross section being provided on the rotor and being opposite and complementary to the stationary mounted L-shaped member, the longer leg of the L-shaped member on the rotor extending inwardly toward the stationary shaft with only a clearance dimension separating the two parts.]

[20. A disk memory drive according to claim 16, wherein the stationary L-shaped member lies inboard axially and is substantially encompassed by the rotating L-shaped ring, a flat radial labyrinth gap being formed radially between the respective short legs of the L-shaped members.]

*21. A disk storage device, comprising in combination:*

*a housing that encloses a clean chamber for providing an environment that is maintained substantially contaminant free;*

*at least one hard magnetic storage disk provided in said clean chamber for rotation about an axis, said at least one disk having a central opening;*

*at least one data head that is provided in said clean chamber and that allows information to be stored on and read from said at least one hard magnetic storage disk;*

*a brushless DC motor including a stator concentric with said axis, a stator winding disposed on said stator, a shaft aligned on said axis, at least one bearing affixed to said shaft, and a rotor that is mounted for rotation about said axis relative to said stator, said rotor having a permanent magnetic ring mounted on a magnetically conductive member in a manner such that a generally cylindrical air gap is defined between adjacent surfaces of said stator and said permanent magnetic ring, said brushless DC motor further including a hub member having a generally cylindrical portion that extends through the central opening of said at least one disk to mount said at least one disk for rotation about said axis in said clean chamber;*

*wherein said brushless DC motor is mounted in said clean chamber so that at least a portion of said hub member is contiguous with at least a portion of said rotor and so that the space of said clean chamber that is occupied by said at least one hard magnetic storage disk is axially separated from the space of said clean chamber that is occupied by said permanent magnetic ring in a direction along side said axis; and*

*wherein said hub member includes a disk support flange that is generally perpendicular to said axis and that is contiguous with the generally cylindrical portion of said hub member, said hub member further having a generally circular groove formed thereon at a location closely spaced adjacent to the portion of said hub member where said generally cylindrical portion of*

*said hub member and said disk support flange contact each other, said at least one hard magnetic storage disk being mounted on said disk support flange.*

*22. The disk storage device of claim 21 wherein the outside diameter of the generally cylindrical portion of said hub member is smaller than at least one of the distances specified in a group consisting of: the outer diameter of said permanent magnetic ring, the inner diameter of said magnetically conductive member, and the outer diameter of said magnetically conductive member.*

*23. The disk storage deivce of claim 21 wherein said magnetically conductive member provides at least a portion of a magnetic return path for said permanent magnetic ring.*

*24. The disk storage device of claim 21 wherein said shaft is rotatable about said axis.*

*25. The disk storage device of claim 21 wherein said permanent magnetic ring is formed from a generally radially oriented permanent magnetic material.*

*26. The disk storage device of claim 25 wherein said permanent magnetic ring is radially magnetized to form a plurality of permanent magnets of alternating polarity, the radial magnetization of said permanent magnets varies in a substantially trapezoidal manner in a circumferential direction, and a pole gap is defined between the magnetic poles in each of said permanent magnets such that the circumferential extent of each pole gap is small compared to the circumferential extent of the magnetic poles in the pair of permanent magnets adjacent thereto.*

*27. The disk storage device of claim 25 wherein said permanent magnetic material comprises a mixture of ferrite and an elastic material.*

*28. The disk storage device of claim 21 said hub member comprises a generally non-magnetically conductive material.*

*29. The disk storage device of claim 28 wherein said generally non-magnetically conductive material comprises a light metal.*

*30. The disk storage device of claim 21 wherein said generally cylindrical groove is formed in said disk support flange.*

*31. The disk storage device of claim 21 wherein said rotor comprises an external rotor.*

*32. The disk storage device of claim 21 wherein said permanent magnetic ring coaxially surrounds the portion of said stator that forms said generally cylindrical air gap.*

*33. A disk storage device, comprising in combination:*

*a housing that encloses a clean chamber for providing an environment that is maintained substantially contaminant free;*

*at least one hard magnetic storage disk provided in said clean chamber for rotation about an axis, said at least one disk having a central opening;*

*at least one data head that is provided in said clean chamber and that allows information to be stored on and read from said at least one hard magnetic storage disk;*

*a brushless DC motor including a stator concentric with said axis, a stator winding disposed on said stator, a shaft aligned on said axis, at least one bearing affixed to said shaft, and a rotor that is mounted for rotation about said axis relative to said stator, said rotor having a permanent magnetic ring mounted on a magnetically conductive member in a manner such that a generally cylindrical air gap is defined between adjacent surfaces of said stator and said permanent magnetic ring, said brushless DC motor further including a hub member having a generally cylindrical portion that extends through the central opening of said at least one disk to mount said at least one disk for rotation about said axis in said clean chamber;*

*wherein said brushless DC motor is mounted in said clean chamber so that at least a portion of said hub member is contiguous with at least a portion of said rotor and so that the outside diameter of the generally cylindrical portion of said hub member is smaller than at least one of the distances specified in a group consisting of: the outer diameter of said permanent magnetic ring, the inner diameter of said magnetically conductive member, and the outer diameter of said magnetically conductive member; and*

*wherein said hub member includes a disk support flange that is generally perpendicular to said axis and that is contiguous with the generally cylindrical portion of said hub member, said hub member further having a generally circular groove formed thereon at a location closely spaced adjacent to the portion of said hub member where said generally cylindrical portion of said hub member and said disk support flange contact each other, said at least one hard magnetic storage disk being mounted on said disk support flange.*

*34. The disk storage device of claim 33 wherein said magnetically conductive member provides at least a portion of a magnetic return path for said permanent magnetic ring.*

*35. The disk storage device of claim 33 wherein said shaft is rotatable about said axis.*

*36. The disk storage device of claim 33 wherein said permanent magnetic ring is formed from a generally radially oriented permanent magnetic material.*

*37. The disk storage device of claim 36 wherein said permanent magnetic ring is radially magnetized to form a plurality of permanent magnets of alternating polarity, the radial magnetization of said permanent magnets varies in a substantially trapezoidal manner in a circumferential extent of each pole gap is small compared to the circumferential extent of the magnetic poles in the pair of permanent magnets adjacent thereto.*

*38. The disk storage device of claim 36 wherein said permanent magnetic material comprises a mixture of ferrite and elastic material.*

*39. The disk storage device of claim 33 wherein said hub member comprises a generally non-magnetically conductive material.*

*40. The disk storage device of claim 39 wherein said generally non-magnetically conductive material comprises a light metal.*

*41. The disk storage device of claim 36 wherein said generally cylindrical groove is formed in said disk support flange.*

*42. The disk storage device of claim 36 wherein said rotor comprise an external rotor.*

*43. The disk storage device of claim 33 wherein said permanent magnetic ring coaxially surrounds the portion of said stator that forms said generally cylindrical air gap.*

* * * * *